(12) United States Patent
Phillips

(10) Patent No.: US 7,604,563 B2
(45) Date of Patent: Oct. 20, 2009

(54) MULTI-SPEED TRANSMISSION

(75) Inventor: Andrew W. Phillips, Saline, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 189 days.

(21) Appl. No.: 11/751,185

(22) Filed: May 21, 2007

(65) Prior Publication Data
US 2008/0293537 A1 Nov. 27, 2008

(51) Int. Cl.
*F16H 3/44* (2006.01)
(52) U.S. Cl. ...................... 475/280; 475/288
(58) Field of Classification Search ......... 475/275–292, 475/313, 319, 325
See application file for complete search history.

(56) References Cited

U.S. PATENT DOCUMENTS

| | | | |
|---|---|---|---|
| 5,106,352 A | 4/1992 | Lepelletier | |
| 6,887,178 B2 | 5/2005 | Miyazaki et al. | |
| 6,910,985 B2 * | 6/2005 | Ishimaru et al. | 475/275 |
| 2005/0003924 A1 | 1/2005 | Tabata et al. | |
| 2008/0039267 A1 * | 2/2008 | Shim | 475/280 |

* cited by examiner

*Primary Examiner*—Roger Pang

(57) ABSTRACT

A multi-speed transmission includes multiple planetary gear sets having members representable by a three-node lever and a five-node lever, with each node representing at least one of the members of the planetary gear sets. The transmission includes seven torque-transmitting mechanisms including three rotating clutches selectively connecting nodes of the three-node lever to nodes of the five-node lever, one rotating clutch selectively connecting the input member with a node of the five-node lever and three brakes grounding selective nodes of the five-node lever to a stationary member. The torque-transmitting mechanisms are engagable in different combinations to provide at least eight forward speed ratios and a reverse speed ratio between an input member and an output member, and there are preferably five alternate forward speed ratios such that there are five different combinations of nine forward speed ratios operable in progression with single-transition shifts between each forward speed ratio.

16 Claims, 8 Drawing Sheets

|      | 50 | 52 | 54 | 55 | 56 | 57 | 58 |
|------|----|----|----|----|----|----|----|
| R2   |    |    |    | O  |    | O  |    |
| R1   |    |    | O  |    |    | O  |    |
| 1st  | O  |    | O  |    |    |    |    |
| 2nd  | O  |    |    | O  |    |    |    |
| 3rd  | O  |    |    |    | O  |    |    |
| 4th  | O  |    |    |    |    | O  |    |
| 5th  | O  |    |    |    |    |    | O  |
| 1st* |    | O  | O  |    |    |    |    |
| 2nd* |    | O  |    | O  |    |    |    |
| 3rd* |    | O  |    |    | O  |    |    |
| 4th* |    | O  |    |    |    | O  |    |
| 5th* |    | O  |    |    |    |    | O  |
| 6th  |    |    |    |    |    | O  | O  |
| 7th  |    |    |    |    | O  |    | O  |
| 8th  |    |    |    | O  |    |    | O  |

|  | 50L | 52L | 54L | 55L | 56L | 57L | 58L | Ratio | Step |
|---|---|---|---|---|---|---|---|---|---|
| R |  |  | O |  |  | O |  | 4.15 | 0.83 |
| 1st | O |  | O |  |  |  |  | 5.01 | 1.75 |
| 2nd |  | O | O |  |  |  |  | 2.86 | 1.41 |
| 3rd |  | O |  | O |  |  |  | 2.03 | 1.31 |
| 4th |  | O |  |  | O |  |  | 1.55 | 1.32 |
| 5th |  | O |  |  |  | O |  | 1.18 | 1.18 |
| 6th |  | O |  |  |  |  | O | 1.00 | 1.18 |
| 7th |  |  |  |  |  | O | O | 0.85 | 1.20 |
| 8th |  |  |  |  | O |  | O | 0.70 |  |

MULTI-SPEED TRANSMISSION

TECHNICAL FIELD

The invention relates to a multi-speed transmission having multiple planetary gear sets and at least seven torque-transmitting mechanisms engagable in different combinations to provide thirteen forward speed ratios and at least two reverse speed ratios, which may be operated as any of an eight to a thirteen-speed transmission.

BACKGROUND OF THE INVENTION

Wide ratio transmissions such as seven or eight speed transmissions offer several advantages including improved vehicle acceleration performance and potentially improved fuel economy over four, five and six speed transmissions. However, increasing the number of speed ratios presents challenges in packaging additional clutches, drive mechanisms for the various gear members, and hydraulic circuit feed paths, and in ensuring an overall axial length that is acceptable.

SUMMARY OF THE INVENTION

A multi-speed transmission is provided that achieves at least eight forward speed ratios and at least one reverse speed ratio using multiple planetary gear sets and at least seven torque-transmitting mechanisms engagable in different combinations.

The multiple planetary gear sets have members representable by a three-node lever and a five-node lever. Each node represents at least one of the members of the planetary gear sets. The three-node lever has a first, second and a third node. The five-node lever has a fourth, a fifth, a sixth, a seventh and an eighth node. The seven torque-transmitting mechanisms include three rotating clutches selectively connecting different nodes of the three-node lever with different nodes of the five-node lever. One rotating clutch selectively connects the input member with one of the nodes of the five-node lever. The seven torque-transmitting mechanisms also include three brakes that ground selected nodes of the five-node lever to a stationary member. One of the nodes of the three-node lever is continuously grounded to the stationary member. The input member is connected to one of the nodes of the three-node lever and the output member is connected to one of the nodes of the five-node lever. The torque-transmitting mechanisms are engagable in different combinations to provide at least eight forward speed ratios and a reverse speed ratio between the input member and the output member. Of course, less than all of the forward speed ratios may be utilized; for example, the transmission may be operated as a six- or seven-speed transmission. Preferably, the torque-transmitting mechanisms are also engageable in additional different combinations to provide five alternate forward speed ratios between the input member and the output member. There are five different combinations of nine forward speed ratios selected from the eight forward speed ratios and five alternate forward speed ratios. These five different combinations of nine forward speed ratios are each operable in progression with single-transition shifts between each forward speed ratio. The shifts between the eight forward speed ratios and five alternate forward speed ratios include eighty different single-transition shifts.

Preferably, at least one of the forward speed ratios is a direct drive speed ratio. Shifts between the direct drive speed ratio and eight others of the forward speed ratios are single-transitions shifts. Also preferably, each of the forward speed ratios may be obtained by a single-transition shift from at least five other of the forward speed ratios. Shifts between the eight forward speed ratios include multiple single transition upshifts.

Preferably, the seven torque-transmitting mechanisms include a grounding clutch engaged in at least one of the eight forward speed ratios and in a reverse speed ratio for vehicle launch. In such an embodiment, this may enable the transmission to operate without a torque converter if the grounding clutch is used for vehicle launch.

With the seven torque-transmitting mechanisms described above, two reverse speed ratios may be established. If an additional torque-transmitting mechanism is provided that connects the input member and the third node to the fourth node, two additional reverse speed ratios may be established for a total of four reverse speed ratios that are operable in progression.

The multiple planetary gear sets include four planetary gear sets. The first planetary gear set is representable by the three-node lever. At least two of the second, third and fourth planetary gear sets are interconnected to form a compound planetary gear set such that the second, third and fourth planetary gear sets are representable by the five-node lever.

In one embodiment, the input member is continuously connected for rotation with the third node and the output member is continuously connected for rotation with the seventh node. The first node is continuously grounded to the stationary member. The first of the rotating clutches is selectively engagable to connect the second node for common rotation with the eighth node. The second of the rotating clutches is selectively engagable to connect the third node for common rotation with the eighth node. The third of the rotating clutches is selectively engagable to connect the second node for common rotation with the fourth node. A fourth of the rotating clutches is selectively engagable to connect the input member for common rotation with the sixth node. A first of the three brakes is selectively engagable to ground the sixth node to the stationary member. A second of the three brakes is selectively engagable to ground the fifth node to the stationary member. A third of the three brakes is selectively engagable to ground the fourth node to the stationary member. Optionally, a free-wheeling, one-way torque-transmitting mechanism is connected in parallel with one of the brakes such as the brake that connects the sixth node to the stationary member.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
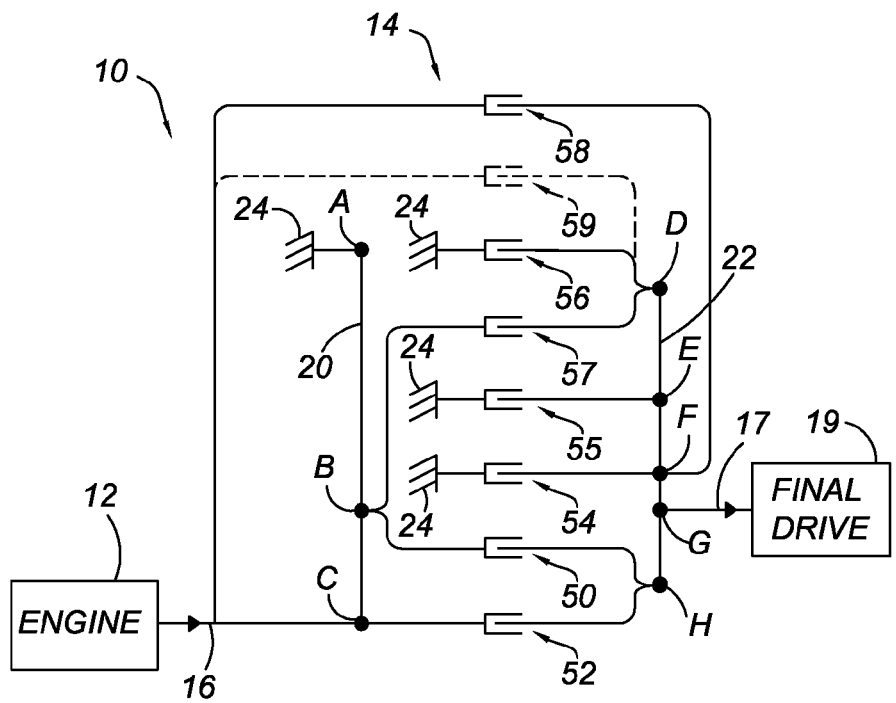
FIG. 1 is an embodiment of a transmission shown in lever diagram form.
FIG. 2 is a truth table showing an engagement schedule for the torque-transmitting mechanisms of the transmission of FIG. 1 to establish eight forward speed ratios, five alternate forward speed ratios and two reverse speed ratios.

Referring to the drawings, wherein like reference numbers refer to like components, FIG. 1 illustrates a powertrain 10 mounted on and partially forming a vehicle (not shown). The powertrain 10 includes an engine 12 connected to a transmission 14. The transmission 14 is designed to receive driving power from the engine 12, as discussed below. The engine 12 powers an input member 16 of the transmission 14. A final drive unit 19 is operatively connected to an output member 17 of the transmission 14.

The transmission 14 includes a three-node lever 20 representing a first planetary gear set having a first, a second and a third member, represented by nodes A, B and C, respectively. The members may be a ring gear member, a sun gear member and a carrier member, although not necessarily in that order. Nodes, A, B and C are referred to in the claims as the first, second and third nodes, respectively. As used herein, a "node" is a component of a transmission, such as a ring gear member, a carrier member, or a sun gear member, which is characterized by a rotational speed and which can act as a junction of torques applied to that component from other components and by that component to other components. The other components which may interact with a given node include other coaxial members of the same set of planetary gears which appear as other nodes on the same lever. The other components which may interact with a given node also include interconnections to members of other planetary gear sets which appear as nodes on another lever, a stationary member such as the transmission case, and other transmission members.

The transmission 14 further includes a five-node lever 22 representing second, third and fourth planetary gear sets interconnected so as to be representable by nodes D, E, F, G and H, respectively. As those skilled in the art will readily understand, two planetary gear sets may be represented as a single lever in a lever diagram when two different members of one of the planetary gear sets are connected for common rotation with two different members of the other planetary gear set. Each of the nodes D, E, F, G and H represent a ring gear member, a sun gear member, or a carrier member, although not necessarily in that order. Nodes D, E, F, G and H are referred to in the claims as the fourth, fifth, sixth, seventh, and eighth node, respectively.

The input member 16 is connected for common rotation with node C. The output member 17 is connected for common rotation with node G. Node A is continuously grounded to a stationary member 24.

The transmission 14 also has selectively engagable torque-transmitting mechanisms that provide various speed ratios, as described below. Torque-transmitting mechanism 50, a rotating-type clutch, is selectively engagable to connect node B for common rotation with node H. Torque-transmitting mechanism 52, also a rotating-type clutch, is selectively engagable to connect node C for common rotation with node H. Another torque-transmitting mechanism 54, a stationary clutch, also referred to as a brake, is selectively engagable to ground node F to the stationary member 24. The notation F1 indicated in FIG. 2 in the column for torque-transmitting mechanism 54 represents an optional one-way freewheeling clutch which may be connected in parallel with torque-transmitting mechanism 54 to permit rotation of node F in only one direction (the direction of rotation of input member 16) when torque-transmitting mechanism 54 is not engaged. Torque-transmitting mechanism 55, another stationary clutch or brake, is selectively engagable to ground node E to the stationary member 24. Torque-transmitting mechanism 56, also a brake, is selectively engagable to ground node D to the stationary member 24. Torque-transmitting mechanism 57, a rotating-type clutch, is selectively engagable to connect node B for common rotation with node D. Torque-transmitting mechanism 58, a rotating-type clutch, is selectively engagable to connect the input member (and also node C) for common rotation with node F. Torque-transmitting mechanism 59, an optional rotating-type clutch, is selectively engagable to connect the input member (and also node C) for common rotation with node D.

The torque-transmitting mechanisms 50, 52, 54, 55, 56, 57 and 58 are selectively engagable in the different combinations of pairs, as illustrated in FIG. 2, to provide two reverse speed ratios (R1 and R2), eight forward speed ratios (1st, 2nd, 3rd, 4th, 5th, 6th, 7th, and 8th) and five alternate forward speed ratios (1st*, 2nd*, 3rd*, 4th* and 5th*) between the input member 16 and the output member 17. Each speed ratio established in FIG. 2 may also be referred to as a "gear". Each of the speed ratios 1st*, 2nd*, 3rd*, 4th* and 5th* is higher than the correspondingly numbered speed ratio 1st, 2nd, 3rd, 4th and 5th, respectively, thereby providing a lower mechanical advantage. As described further below, torque-transmitting mechanism 54, used to partially establish certain of the speed ratios of FIG. 2, may also be used in an integrated friction launch in lieu of a torque converter. Those skilled in the art will readily recognize that the engagement of these different combinations of torque-transmitting mechanisms shown in FIG. 2 will result in thirteen forward speed ratios having different numerical values, as well as two reverse speed ratios with different numerical values.

A controller (not shown) is operatively connected with the torque-transmitting mechanisms and is programmed with an algorithm to select different ones of the speed ratios set forth in FIG. 2 to provide anywhere between eight and thirteen forward speed ratios. Although up to thirteen forward speed ratios (those listed in FIG. 2) may be available, only nine are operable in progression with single-transition shifts. Thus, a nine-speed transmission with single-transition shifts is provided. Alternatively, less than eight of the forward speed ratios may also be selected, such as to enable a six-speed, seven-speed or eight-speed transmission with single-transition shifts. The speed ratios chosen or permitted by the controller may depend upon whether single-transition shifts are desired. As used herein, a "single-transition shift" in the context of speed ratios established with pairs of engaged torque-transmitting mechanisms means that one torque-transmitting mechanism remains engaged and another torque-transmitting mechanism is disengaged while a different torque-transmitting mechanism is engaged in shifting from one speed ratio to a subsequent speed ratio (whether in an upshift or a downshift). As is apparent from FIG. 2, the eight forward speed ratios 1st, 2nd, 3rd, 4th, 5th, 6th, 7th, and 8th are operable in progression with single-transition shifts. Additionally, there are multiple single-transition upshifts (shifts from a lower numbered speed ratio to a higher numbered speed ratio (i.e., 1st to 2nd), which are shifts from a higher numerical speed ratio to a lower numerical speed ratio.

The topology and ring gear member to sun gear member tooth ratios of a specific transmission embodiment implementing the lever diagram embodiment of FIG. 1 will determine the most pleasing progression of the forward speed ratios for a given application and/or driving situation. Because each of the speed ratios established as set forth in FIG. 2 require only two torque-transmitting mechanisms to be applied, and because most utilize only one rotating clutch (i.e., only one of torque-transmitting mechanisms 50, 52, 57 and 58), hydraulic leakage losses are minimized, as these are more commonly encountered with rotating-type than with stationary-type torque-transmitting mechanisms. Additionally, the transmission 14 is able to be used in both front-wheel drive and rear-wheel drive applications, as the input member 16 and the output member 17 may be made co-linear, as corresponding input and output members in the stick-diagram embodiments of FIGS. 3-13 are arranged.

Referring to FIG. 2, there are five different combinations of nine forward speed ratios operable in progression using single-transition shifts. One such nine-speed progression is: 1st-1st*-2nd*-3rd*-4th*-5th*-6th-7th-8th. A second nine-speed progression with single-transition shifts is: 1st-2nd-2nd*-3rd*-4th*-5th*-6th-7th-8th. A third nine-speed progression with single-transition shifts is: 1st-2nd-3rd-3rd*-4th*-5th*-6th-7th-8th. A fourth nine-speed progression with single-transition shifts is: 1st-2nd-3rd-4th-4th*-5th*-6th-7th-8th. A fifth nine-speed progression with single-transition shifts is: 1st-2nd-3rd-4th-5th-5th*-6th-7th-8th.

Referring to FIG. 2, there are a total of eighty different single-transition shifts between forward speed ratios (i.e., between any two of the forward speed ratios 1st, 2nd, 3rd, 4th, 5th, 1st*, 2nd*, 3rd*, 4th*, 5th*, 6th, 7th or 8th, counting both a downshift and an upshift between two given speed ratios as two different single-transition shifts). This is readily determined by noting that there are seven groupings of forward speed ratios in FIG. 2 that differ by only one torque-transmitting mechanism (i.e., by a single-transition shift). These are: (1st-2nd-3rd-4th-5th); (1st*-2nd*-3rd*-4th*-5th*); (1st-1st*); (2nd-2nd*-8th); (3rd-3rd*-7th); (4th-4th*-6th); (5th-5th*-6th-7th-8th). Thus, each of these groupings can be considered a different single-transition set. In each single-transition set, the number of single-transition shifts is:

$N*(N-1)$, where N is the number of speed ratios in the set.

Therefore, summing all of the single-transition shifts in each of the seven sets listed above gives:

5*4+5*4+2*1+3*2+3*2+3*2+5*4=80.

By comparison, a transmission that offers only six different forward speed ratios may have only twenty-two single-transition shifts. Each of the forward speed ratios of FIG. 2 is included in two of the seven groupings and can therefore transition to between five and eight of the other forward speed ratios with a single-transition shift in each instance. The ability to shift to a variety of different speed ratios with a single-transition shift in response to driver input or driving conditions, such as in response to sudden throttle input (and associated increase in speed of the input member), is an advantage of the transmission 14.

If the optional torque-transmitting mechanism 59 is provided, then two additional reverse speed ratios, not listed in Table 2, may be achieved by engaging torque-transmitting mechanism 59 along with either torque-transmitting mechanism 54 or 55, to provide two additional reverse speed ratios, one of which (established by engagement of torque-transmitting mechanisms 55 and 59) is operable at a higher numerical value than R2, and the other of which (established by engagement of torque-transmitting mechanisms 54 and 59) is operable at a numerical value between that of speed ratios R2 and R1. The optional torque-transmitting mechanism 59 may also be engaged with torque-transmitting mechanism 50 to establish an additional underdrive speed ratio.

The alternate forward speed ratio 5th* is a direct drive speed ratio, having a numerical speed ratio of 1.0. That is, because torque-transmitting mechanisms 52 and 58 are engaged, nodes H and F rotate at the same speed as the input member, driving node G and the output member 17 to also rotate at the same speed as the input member. A direct drive speed ratio is very mechanically efficient relative to other speed ratios because no power is transmitted across moving gear meshes and there is therefore no inefficiency associated with the slight rolling or sliding motion of the teeth. Eight of the other forward speed ratios (5th, 1st*, 2nd*, 3rd*, 4th*, 6th, 7th and 8th) can shift to the direct drive speed ratio 5th* using a single-transition shift, as is evident from FIG. 2.

Another feature of the transmission 14 of FIG. 1 is that torque-transmitting mechanism 54 is a grounding clutch (i.e., a brake) that is engaged in the lowest forward speed ratios 1st and 1st*, as well as in the lowest reverse speed ratio R1 in order for the transmission 14 to launch a vehicle (i.e., to cause rotation of the output member 17 from a stationary state). For example, the reaction torque provided by the stationary member 24 when the torque-transmitting mechanisms 50 and 54 are engaged allows the output member 17 to rotate in a forward direction, establishing the forward speed ratio 1st. Using a friction-based torque-transmitting mechanism that is necessary to establish a given speed ratio in order to launch the vehicle as well provides packaging and weight savings relative to a transmission having the same gear sets and torque-transmitting mechanisms but also requiring a torque converter.

Figure 3:
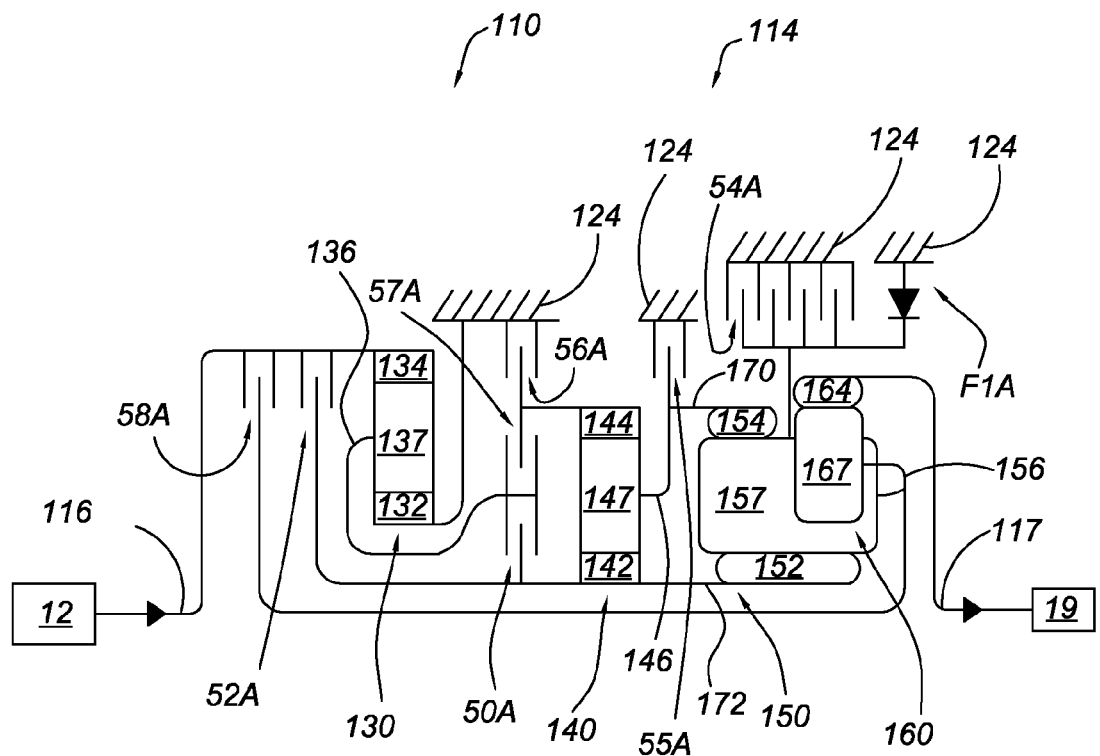
FIG. 3 is a first embodiment in stick diagram form of the transmission of FIG. 1.

Referring to FIG. 3, a powertrain 110 has a transmission 114 configured in accordance with and operable in like manner as the transmission 14 shown in lever diagram form in FIG. 1. The powertrain 110 includes engine 12 powering an input member 116 of the transmission 114. Final drive unit 19 is operatively connected to an output member 117 of the transmission 114.

The transmission 114 includes simple planetary gear sets 130 and 140, as well as planetary gear sets 150 and 160 interconnected to form a compound planetary gear set 150, 160. Planetary gear set 130 includes a sun gear member 132, a ring gear member 134, and a carrier member 136 that rotatably supports a plurality of pinion gears 137 that mesh with both the ring gear member 134 and the sun gear member 132.

Planetary gear set 140 includes a sun gear member 142, a ring gear member 144, and a carrier member 146 that rotatably supports a plurality of pinion gears 147 that mesh with both the ring gear member 144 and the sun gear member 142.

Compound planetary gear set 150, 160 includes planetary gear set 150 having a sun gear member 152, a ring gear member 154 and a carrier member 156 that rotatably supports a plurality of pinion gears 157 that mesh with both the sun gear member 152 and the ring gear member 154. The pinion gears 157 are long pinion gears. The carrier member 156 also rotatably supports a second set of pinion gears 167 that are included in planetary gear set 160. Gear set 160 also includes ring gear member 164. Pinion gears 167 mesh with the pinion gears 157 and with the ring gear member 164.

The input member 116 is continuously connected for common rotation with the ring gear member 134. Sun gear member 132 is continuously grounded to a stationary member 124, such as a casing of the transmission 114. Ring gear member 164 is continuously connected for common rotation with output member 117. An interconnecting member 170 continuously connects carrier member 146 for common rotation with ring gear member 154. Interconnecting member 172 continuously connects sun gear member 142 for common rotation with sun gear member 152.

The transmission 114 has seven selectively engagable torque-transmitting mechanisms 50A, 52A, 54A, 55A, 56A, 57A, and 58A, as well as a free-wheeling one-way clutch F1A that is that is connected in parallel with torque-transmitting mechanism 54A and permits rotation in only one direction. Torque-transmitting mechanism 50A is selectively engagable to connect carrier member 136 for common rotation with sun gear member 142. Torque-transmitting mechanism 52A is selectively engagable to connect input member 116 for common rotation with sun gear member 142 and sun gear member 152. Torque-transmitting mechanism 54A is selectively engagable to ground carrier member 156 with stationary member 124. Free-wheeling one-way clutch F1A prevents rotation of carrier member 156 in a direction opposite the input member 116. Torque-transmitting mechanism 55A is selectively engagable to ground carrier member 146 and ring gear member 154 to the stationary member 124. Torque-transmitting mechanism 56A is selectively engagable to ground ring gear member 144 to the stationary member 124. Torque-transmitting mechanism 57A is selectively engagable to connect carrier member 136 for common rotation with ring gear member 144. Torque-transmitting mechanism 58A is selectively engagable to connect input member 116 for common rotation with carrier member 156.

The members of transmission 114 correspond with the lever diagram transmission 14 of FIG. 1 as follows: sun gear member 132 corresponds with node A; carrier member 136 corresponds with node B; ring gear member 134 corresponds with node C; ring gear member 144 corresponds with node D; interconnected carrier member 146 and ring gear member 154 correspond with node E; carrier member 156 corresponds with node F; ring gear member 164 corresponds with node G; and sun gear member 142 corresponds with node H. The torque-transmitting mechanisms 50A, 52A, 54A, 55A, 56A, 57A, and 58A correspond with torque-transmitting mechanisms 50, 52, 54, 55, 56, 57, and 58, respectively, and are engagable according to the same schedule of FIG. 2 to achieve the same number of forward speed ratios and two reverse speed ratios (e.g., thirteen different forward speed ratios, five different combinations of nine of which are operable in progression with single-transition shifts, etc.).

Figure 4:
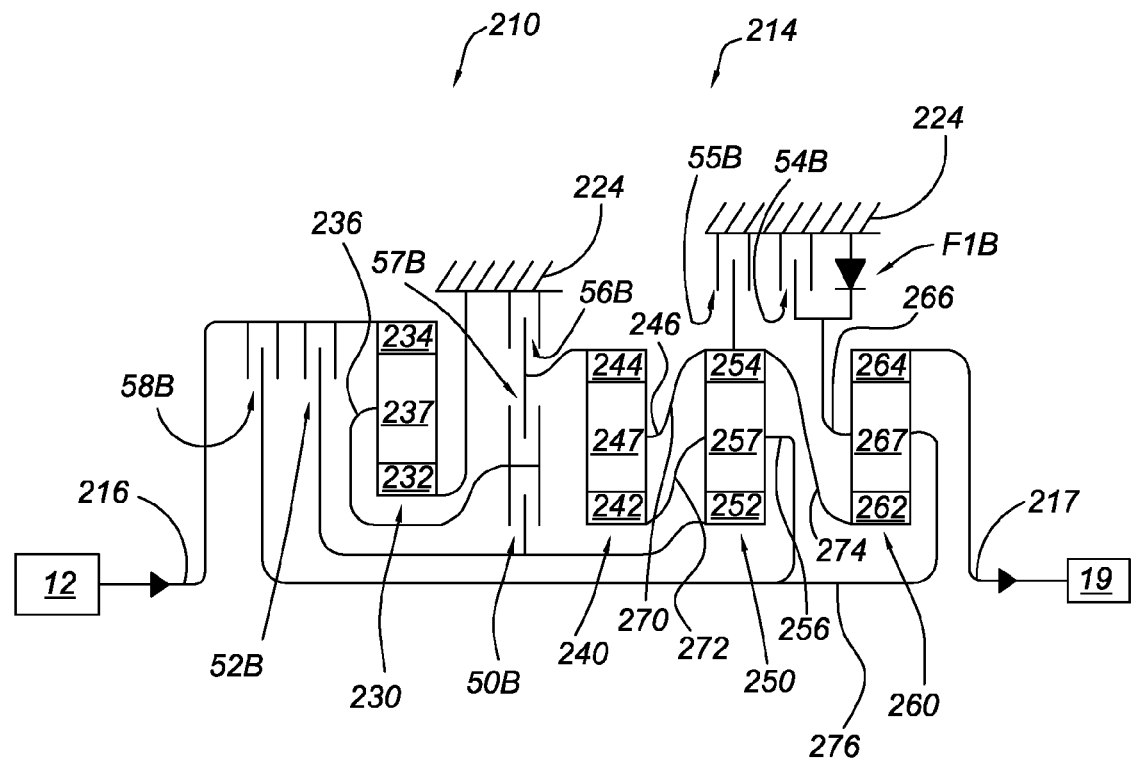
FIG. 4 is a second embodiment in stick diagram form of the transmission of FIG. 1.

Referring to FIG. 4, a powertrain 210 has a transmission 214 configured in accordance with and operable in like manner as the transmission 14 shown in lever diagram form in FIG. 1. The powertrain 210 includes engine 12 powering an input member 216 of the transmission 214. Final drive unit 19 is operatively connected to an output member 217 of the transmission 214.

The transmission 214 includes simple planetary gear sets 230, 240, 250, and 260. Planetary gear set 230 includes a sun gear member 232, a ring gear member 234, and a carrier member 236 that rotatably supports a plurality of pinion gears 237 that mesh with both the ring gear member 234 and the sun gear member 232.

Planetary gear set 240 includes a sun gear member 242, a ring gear member 244, and a carrier member 246 that rotatably supports a plurality of pinion gears 247 that mesh with both the ring gear member 244 and the sun gear member 242.

Planetary gear set 250 includes a sun gear member 252, a ring gear member 254, and a carrier member 256 that rotatably supports a plurality of pinion gears 257 that mesh with both the ring gear member 254 and the sun gear member 252.

Planetary gear set 260 includes a sun gear member 262, a ring gear member 264, and a carrier member 266 that rotatably supports a plurality of pinion gears 267 that mesh with both the ring gear member 264 and the sun gear member 262.

The input member 216 is continuously connected for common rotation with the ring gear member 234. Sun gear member 232 is continuously grounded to a stationary member 224, such as a casing of the transmission 214. Ring gear member 264 is continuously connected for rotation with output member 217. An interconnecting member 270 continuously connects carrier member 246 for common rotation with ring gear member 254. Interconnecting member 272 continuously connects sun gear member 242 for common rotation with carrier member 256. Interconnecting member 274 continuously connects ring gear member 254 for common rotation with sun gear member 262. Interconnecting member 276 continuously connects carrier member 256 for common rotation with carrier member 266.

The transmission 214 has seven selectively engagable torque-transmitting mechanisms 50B, 52B, 54B, 55B, 56B, 57B, and 58B, as well as a free-wheeling one-way clutch F1B that is connected in parallel with torque-transmitting mechanism 54B and permits rotation in only one direction. Torque-transmitting mechanism 50B is selectively engagable to connect carrier member 236 for common rotation with sun gear member 252. Torque-transmitting mechanism 52B is selectively engagable to connect input member 216 for common rotation with sun gear member 252. Torque-transmitting mechanism 54B is selectively engagable to ground carrier member 266 with stationary member 224. Free-wheeling one-way clutch F1B prevents rotation of carrier member 266 in a direction opposite the input member 216. Torque-transmitting mechanism 55B is selectively engagable to ground carrier member 246, ring gear member 254 and sun gear member 262 to the stationary member 224. Torque-transmitting mechanism 56B is selectively engagable to ground ring gear member 244 to the stationary member 224. Torque-transmitting mechanism 57B is selectively engagable to connect carrier member 236 for common rotation with ring gear member 244. Torque-transmitting mechanism 58B is selectively engagable to connect input member 216 for common rotation with carrier member 266, carrier member 256 and sun gear member 242.

The members of transmission 214 correspond with the lever diagram transmission 14 of FIG. 1 as follows: sun gear member 232 corresponds with node A; carrier member 236 corresponds with node B; ring gear member 234 corresponds with node C; ring gear member 244 corresponds with node D;

interconnected carrier member 246, ring gear member 254 and sun gear member 262 correspond with node E; interconnected sun gear member 242 and carrier member 256 correspond with node F; ring gear member 264 corresponds with node G; and sun gear member 252 corresponds with node H. The torque-transmitting mechanisms 50B, 52B, 54B, 55B, 56B, 57B, and 58B correspond with torque-transmitting mechanisms 50, 52, 54, 55, 56, 57, and 58, respectively, and are engagable according to the same schedule of FIG. 2 to achieve the same number of forward speed ratios and two reverse speed ratios (e.g., thirteen different forward speed ratios, five different combinations of nine of which are operable in progression with single-transition shifts, etc.).

Figure 5:
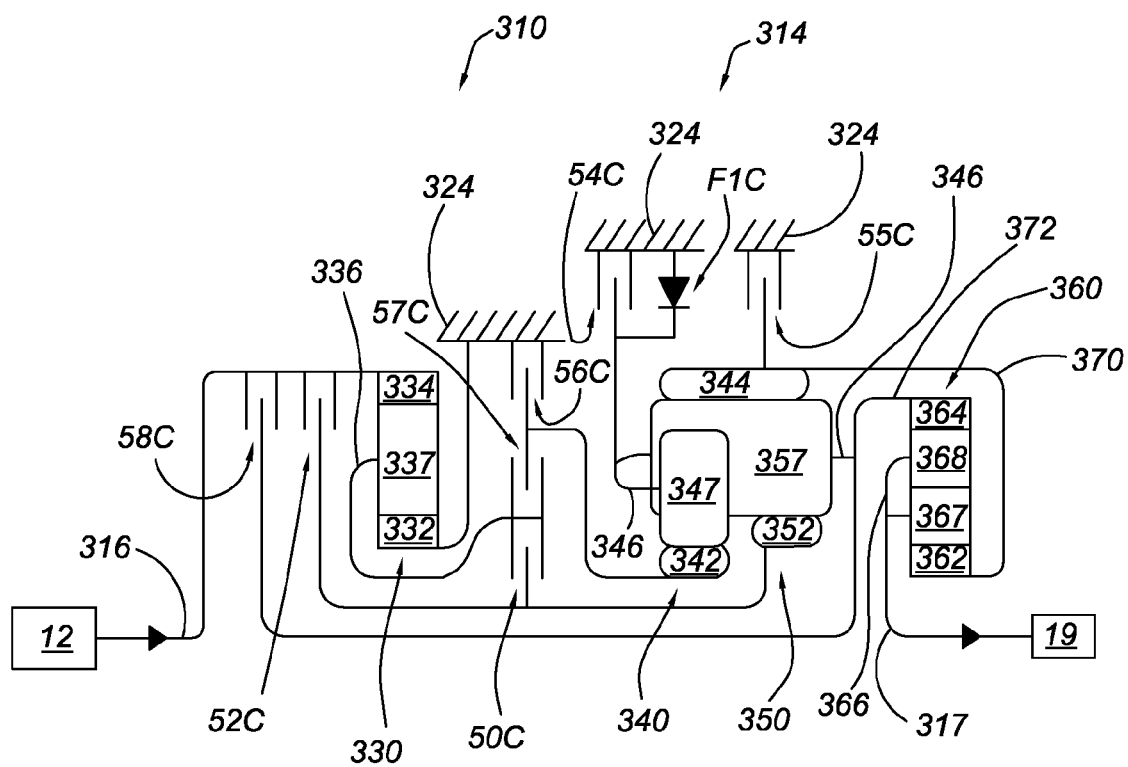
FIG. 5 is a third embodiment in stick diagram form of the transmission of FIG. 1.

Referring to FIG. 5, a powertrain 310 has a transmission 314 configured in accordance with and operable in like manner as the transmission 14 shown in lever diagram form in FIG. 1. The powertrain 310 includes engine 12 powering an input member 316 of the transmission 314. Final drive unit 19 is operatively connected to an output member 317 of the transmission 314.

The transmission 314 includes simple planetary gear set 330, as well as planetary gear sets 340, 350 interconnected to form compound planetary gear set 340, 350, and dual pinion planetary gear set 360. Planetary gear set 330 includes a sun gear member 332, a ring gear member 334, and a carrier member 336 that rotatably supports a plurality of pinion gears 337 that mesh with both the ring gear member 334 and the sun gear member 332.

Planetary gear set 340 includes a sun gear member 342, a ring gear member 344, and a carrier member 346 that rotatably supports a plurality of pinion gears 347 that mesh with the sun gear member 342. Planetary gear set 350 includes sun gear member 352 and long pinion gears 357 that intermesh with pinion gears 347 with sun gear member 352, and with ring gear member 344.

Planetary gear set 360 includes a sun gear member 362, a ring gear member 364, and a carrier member 366 that rotatably supports a first set of pinion gears 367 and a second set of pinion gears 368. Pinion gears 367 intermesh with sun gear member 362, and pinion gears 368 intermesh with the first set of pinion gears 367 and with ring gear member 364.

The input member 316 is continuously connected for common rotation with the ring gear member 334. Sun gear member 332 is continuously grounded to a stationary member 324, such as a casing of the transmission 314. Carrier member 366 is continuously connected with output member 317. Interconnecting member 370 continuously connects ring gear member 344 with sun gear member 362. Interconnecting member 372 continuously connects carrier member 346 with ring gear member 364.

The transmission 314 has seven selectively engagable torque-transmitting mechanisms 50C, 52C, 54C, 55C, 56C, 57C, and 58C, as well as a free-wheeling one-way clutch F1C that is connected in parallel with torque-transmitting mechanism 54C and permits rotation in only one direction. Torque-transmitting mechanism 50C is selectively engagable to connect carrier member 336 for common rotation with sun gear member 352. Torque-transmitting mechanism 52C is selectively engagable to connect input member 316 for common rotation with sun gear member 352. Torque-transmitting mechanism 54C is selectively engagable to ground carrier member 346 with stationary member 324. Free-wheeling one-way clutch F1C prevents rotation of carrier member 346 in a direction opposite the input member 316. Torque-transmitting mechanism 55C is selectively engagable to ground ring gear member 344 and sun gear member 362 to the stationary member 324. Torque-transmitting mechanism 56C is selectively engagable to ground sun gear member 342 to the stationary member 324. Torque-transmitting mechanism 57C is selectively engagable to connect carrier member 336 for common rotation with sun gear member 342. Torque-transmitting mechanism 58C is selectively engagable to connect input member 316 for common rotation with carrier member 346 and ring gear member 364.

The members of transmission 314 correspond with the lever diagram transmission 14 of FIG. 1 as follows: sun gear member 332 corresponds with node A; carrier member 336 corresponds with node B; ring gear member 334 corresponds with node C; sun gear member 342 corresponds with node D; ring gear member 344 and sun gear member 362 correspond with node E; carrier member 346 and ring gear member 364 correspond with node F; carrier member 366 corresponds with node G; and sun gear member 352 corresponds with node H. The torque-transmitting mechanisms 50C, 52C, 54C, 55C, 56C, 57C, and 58C correspond with torque-transmitting mechanisms 50, 52, 54, 55, 56, 57, and 58, respectively, and are engagable according to the same schedule of FIG. 2 to achieve the same number of forward speed ratios and two reverse speed ratios (e.g., thirteen different forward speed ratios, five different combinations of nine of which are operable in progression with single-transition shifts, etc.).

Figure 6:
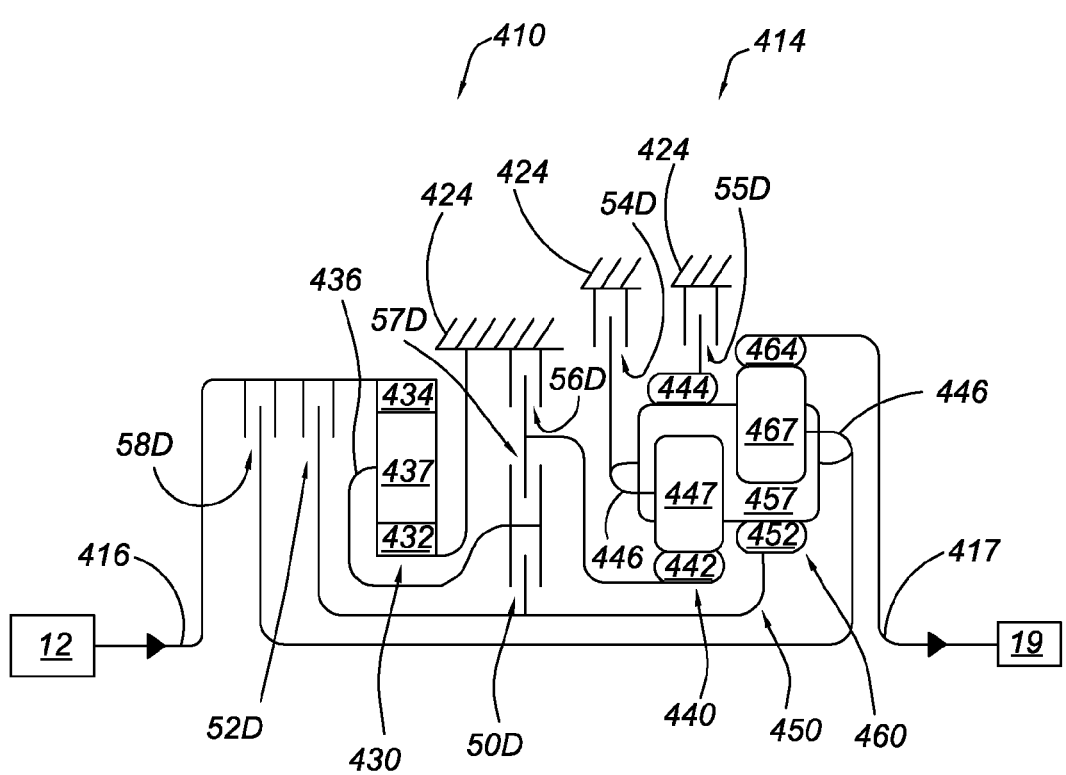
FIG. 6 is a fourth embodiment in stick diagram form of the transmission of FIG. 1.

Referring to FIG. 6, a powertrain 410 has a transmission 414 configured in accordance with and operable in like manner as the transmission 14 shown in lever diagram form in FIG. 1. The powertrain 410 includes engine 12 powering an input member 416 of the transmission 414. Final drive unit 19 is operatively connected to an output member 417 of the transmission 414.

The transmission 414 includes simple planetary gear set 430, as well as planetary gear sets 440, 450 and 450 interconnected to form compound, planetary gear set 440, 450, 460. Planetary gear set 430 includes a sun gear member 432, a ring gear member 434, and a carrier member 436 that rotatably supports a plurality of pinion gears 437 that mesh with both the ring gear member 434 and the sun gear member 432.

Planetary gear set 440 includes a sun gear member 442, a ring gear member 444, and a carrier member 446 that rotatably supports a plurality of pinion gears 447 that mesh with the sun gear member 442. Planetary gear set 450 includes sun gear member 452 and long pinion gears 457, also rotatably supported on carrier member 446, that intermesh with sun gear member 452, with pinion gears 447 and ring gear member 444. Planetary gear set 460 includes pinion gears 467, also rotatably supported on carrier member 446, that intermesh with pinion gears 457, as well as ring gear member 464 intermeshing with pinion gears 467.

The input member 416 is continuously connected for common rotation with the ring gear member 434. Sun gear member 432 is continuously grounded to a stationary member 424, such as a casing of the transmission 414. Ring gear member 464 is continuously connected with output member 417.

The transmission 414 has seven selectively engagable torque-transmitting mechanisms 50D, 52D, 54D, 55D, 56D, 57D, and 58D. Torque-transmitting mechanism 50D is selectively engagable to connect carrier member 436 for common rotation with sun gear member 452. Torque-transmitting mechanism 52D is selectively engagable to connect input member 416 for common rotation with sun gear member 452. Torque-transmitting mechanism 54D is selectively engagable to ground carrier member 446 with stationary member 424. Torque-transmitting mechanism 55D is selectively engagable to ground ring gear member 444 to the stationary member 424. Torque-transmitting mechanism 56D is selectively engagable to ground sun gear member 442 to the stationary member 424. Torque-transmitting mechanism 57D is selectively engagable to connect carrier member 436 for common rotation with sun gear member 442. Torque-transmitting mechanism 58D is selectively engagable to connect input member 416 for common rotation with carrier member 446.

The members of transmission 414 correspond with the lever diagram transmission 14 of FIG. 1 as follows: sun gear member 432 corresponds with node A; carrier member 436 corresponds with node B; ring gear member 434 corresponds with node C; sun gear member 442 corresponds with node D; ring gear member 444 corresponds with node E; carrier member 446 corresponds with node F; ring gear member 464 corresponds with node G; and sun gear member 452 corresponds with node H. The torque-transmitting mechanisms 50D, 52D, 54D, 55D, 56D, 57D, and 58D correspond with torque-transmitting mechanisms 50, 52, 54, 55, 56, 57, and 58, respectively, and are engagable according to the same schedule of FIG. 2 to achieve the same number of forward speed ratios and two reverse speed ratios (e.g., thirteen different forward speed ratios, five different combinations of nine of which are operable in progression with single-transition shifts, etc.).

One exemplary set of tooth ratios for the transmission 414 is ring gear member 434 to sun gear member 432: 1.41:1; ring gear member 444 to sun gear member 442: 2.42:1; ring gear member 444 to sun gear member 452: 1.99:1; and ring gear member 464 to sun gear member 452: 2.17:1. With these tooth ratios, the following two reverse speed ratios and thirteen forward speed ratios are achieved: the reverse speed ratio R2 by engagement of torque-transmitting mechanisms 55D and 57D is 0.958; the reverse speed ratio R1 by engagement of torque-transmitting mechanisms 54D and 57D is 3.410; the forward speed ratio 1st by engagement of torque-transmitting mechanisms 50D and 54D is 4.139; the forward speed ratio 1st* by engagement of torque-transmitting mechanisms 52D and 54D is 2.420; the forward speed ratio 2nd by engagement of torque-transmitting mechanisms 50D and 55D is 2.976; the forward speed ratio 2nd* by engagement of torque-transmitting mechanisms 52D and 55D is 1.740; the forward speed ratio 3rd by engagement of torque-transmitting mechanisms 50D and 56D is 2.521; the forward speed ratio 3rd* by engagement of torque-transmitting mechanisms 52D and 56D is 1.474; the forward speed ratio 4th by engagement of torque-transmitting mechanisms 50D and 57D is 1.710; the forward speed ratio 4th* by engagement of torque-transmitting mechanisms 52D and 57D is 1.154; the forward speed ratio 5th by engagement of torque-transmitting mechanisms 50D and 58D is 1.207; the forward speed ratio 5th* by engagement of torque-transmitting mechanisms 52D and 58D is 1.000 (direct drive); the forward speed ratio 6th by engagement of torque-transmitting mechanisms 57D and 58D is 0.828; the forward speed ratio 7th by engagement of torque-transmitting mechanisms 56D and 58D is 0.666; and the forward speed ratio 8th by engagement of torque-transmitting mechanisms 55D and 58D is 0.479. These numerical speed ratios correspond with the following ratio steps according to the one reverse and nine-speed (forward) progression (R1-1st-1st*-2nd*-3rd*-4th*-5th*-6th-7th-8th): reverse speed ratio R1 to forward speed ratio 1st: 0.824; forward speed ratio 1st to forward speed ratio 1st*: 1.710; forward speed ratio 1st* to forward speed ratio 2nd*: 1.391; forward speed ratio 2nd* to forward speed ratio 3rd*: 1.180; forward speed ratio 3rd* to forward speed ratio 4th*: 1.277; forward speed ratio 4th* to forward speed ratio 5th*: 1.154; forward speed ratio 5th* to forward speed ratio 6th: 1.208; forward speed ratio 6th to forward speed ratio 7th: 1.243; and forward speed ratio 7th to forward speed ratio 8th: 1.391.

Figure 7:
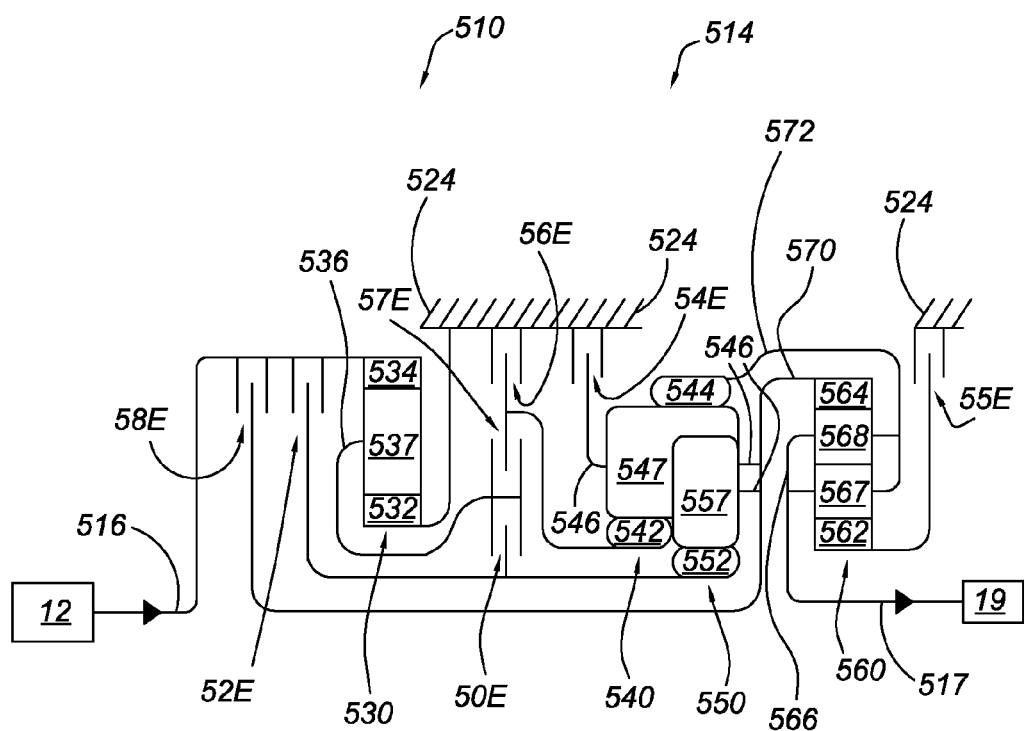
FIG. 7 is a fifth embodiment in stick diagram form of the transmission of FIG. 1.

Referring to FIG. 7, a powertrain 510 has a transmission 514 configured in accordance with and operable in like manner as the transmission 14 shown in lever diagram form in FIG. 1. The powertrain 510 includes engine 12 powering an input member 516 of the transmission 514. Final drive unit 19 is operatively connected to an output member 517 of the transmission 514.

The transmission 514 includes simple planetary gear set 530, as well as compound, interconnected planetary gear sets 540, 550, and dual pinion planetary gear set 560. Planetary gear set 530 includes a sun gear member 532, a ring gear member 534, and a carrier member 536 that rotatably supports a plurality of pinion gears 537 that mesh with both the ring gear member 534 and the sun gear member 532.

Planetary gear set 540 includes a sun gear member 542, a ring gear member 544, and a carrier member 546 that rotatably supports a plurality of long pinion gears 547 that mesh with the sun gear member 542. Planetary gear set 550 includes sun gear member 552, and pinion gears 557, also rotatably supported on carrier member 546 and intermeshing with pinion gears 547 and ring gear member 544.

Planetary gear set 560 includes a sun gear member 562, a ring gear member 564, and carrier member 566 that rotatably supports a first set of pinion gears 567 that intermesh with the sun gear member 562 and a second set of pinion gears 568 that intermesh with the first set of pinion gears 567 and with the ring gear member 564.

The input member 516 is continuously connected for common rotation with the ring gear member 534. Sun gear member 532 is continuously grounded to a stationary member 524, such as a casing of the transmission 514. Carrier member 566 is continuously connected with output member 517. Interconnecting member 570 continuously connects carrier member 546 with ring gear member 564. Interconnecting member 572 continuously connects carrier member 566 with ring gear member 544.

The transmission 514 has seven selectively engagable torque-transmitting mechanisms 50E, 52E, 54E, 55E, 56E, 57E, and 58E. Torque-transmitting mechanism 50E is selectively engagable to connect carrier member 536 for common rotation with sun gear member 552. Torque-transmitting mechanism 52E is selectively engagable to connect input member 516 for common rotation with sun gear member 552. Torque-transmitting mechanism 54E is selectively engagable to ground carrier member 546 with stationary member 524. Torque-transmitting mechanism 55E is selectively engagable to ground sun gear member 562 to the stationary member 524. Torque-transmitting mechanism 56E is selectively engagable to ground sun gear member 542 to the stationary member 524. Torque-transmitting mechanism 57E is selectively engagable to connect carrier member 536 for common rotation with sun gear member 542. Torque-transmitting mechanism 58E is selectively engagable to connect input member 516 for common rotation with carrier member 546 and ring gear member 564.

The members of transmission 514 correspond with the lever diagram transmission 14 of FIG. 1 as follows: sun gear member 532 corresponds with node A; carrier member 536 corresponds with node B; ring gear member 534 corresponds with node C; sun gear member 542 corresponds with node D; sun gear member 562 corresponds with node E; carrier member 546 and ring gear member 564 correspond with node F; carrier member 566 and ring gear member 544 correspond with node G; and sun gear member 552 corresponds with node H. The torque-transmitting mechanisms 50E, 52E, 54E, 55E, 56E, 57E, and 58E correspond with torque-transmitting mechanisms 50, 52, 54, 55, 56, 57, and 58, respectively, and are engagable according to the same schedule of FIG. 2 to achieve the same number of forward speed ratios and two reverse speed ratios (e.g., thirteen different forward speed ratios, five different combinations of nine of which are operable in progression with single-transition shifts, etc.).

Figure 8:
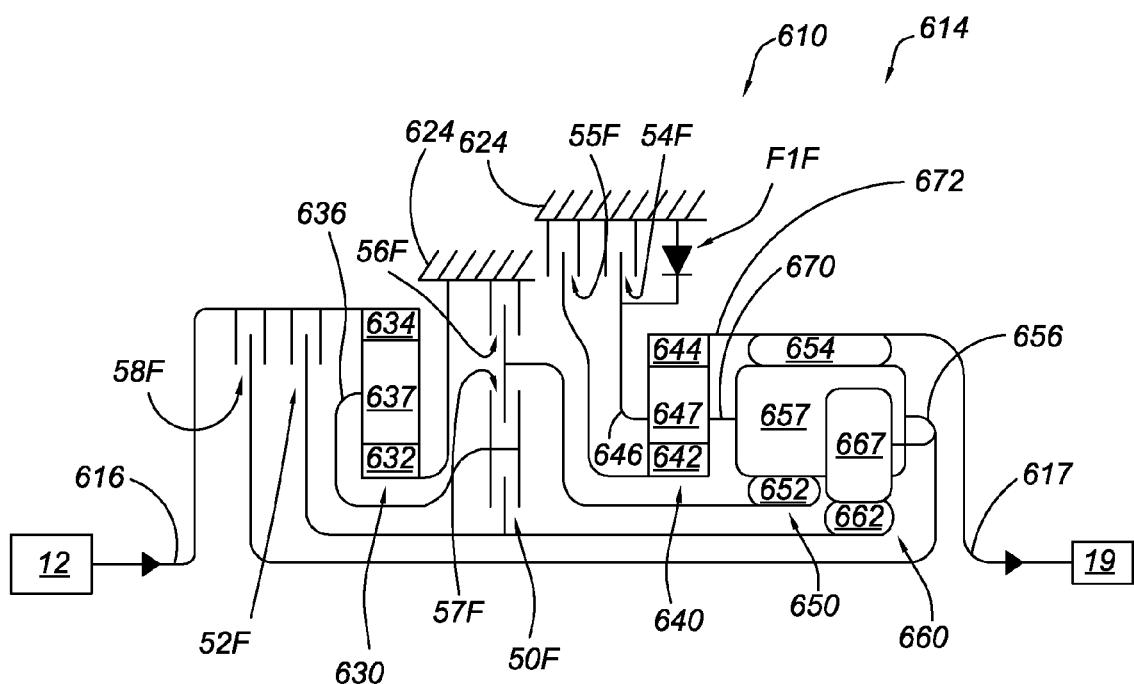
FIG. 8 is a sixth embodiment in stick diagram form of the transmission of FIG. 1.

Referring to FIG. 8, a powertrain 610 has a transmission 614 configured in accordance with and operable in like manner as the transmission 14 shown in lever diagram form in FIG. 1. The powertrain 610 includes engine 12 powering an input member 616 of the transmission 614. Final drive unit 19 is operatively connected to an output member 617 of the transmission 614.

The transmission 614 includes simple planetary gear set 630, simple planetary gear set 640, and planetary gear sets 650 and 660 which are interconnected to form compound planetary gear set 650, 660. Planetary gear set 630 includes a sun gear member 632, a ring gear member 634, and a carrier member 636 that rotatably supports a plurality of pinion gears 637 that mesh with both the ring gear member 634 and the sun gear member 632.

Planetary gear set 640 includes a sun gear member 642, a ring gear member 644, and a carrier member 646 that rotatably supports a plurality of pinion gears 647 that mesh with both the sun gear member 642 and the ring gear member 644.

Planetary gear set 650 includes sun gear member 652, ring gear member 654 and carrier member 656 that rotatably supports long pinion gears 657 that mesh with both the sun gear member 652 and the ring gear member 654. Planetary gear set 660 includes sun gear member 662, and a set of pinion gears 667, also rotatably supported by carrier member 656, that mesh with the sun gear member 662, with the long pinion gears 657 and with the ring gear member 654.

The input member 616 is continuously connected for common rotation with the ring gear member 634. Sun gear member 632 is continuously grounded to a stationary member 624, such as a casing of the transmission 614. Ring gear member 654 is continuously connected with output member 617. Interconnecting member 670 continuously connects carrier member 656 with carrier member 646. Interconnecting member 672 continuously connects ring gear member 644 with ring gear member 654.

The transmission 614 has seven selectively engagable torque-transmitting mechanisms 50F, 52F, 54F, 55F, 56F, 57F, and 58F, as well as a free-wheeling one-way clutch F1F that is connected in parallel with torque-transmitting mechanism 54F and permits rotation in only one direction. Torque-transmitting mechanism 50F is selectively engagable to connect carrier member 636 for common rotation with sun gear member 662. Torque-transmitting mechanism 52F is selectively engagable to connect input member 616 for common rotation with sun gear member 662. Torque-transmitting mechanism 54F is selectively engagable to ground carrier member 646 and carrier member 656 with stationary member 624. Free-wheeling one-way clutch F1F prevents rotation of carrier member 646 in a direction opposite the input member 616. Torque-transmitting mechanism 55F is selectively engagable to ground sun gear member 642 to the stationary member 624. Torque-transmitting mechanism 56F is selectively engagable to ground sun gear member 652 to the stationary member 624. Torque-transmitting mechanism 57F is selectively engagable to connect carrier member 636 for common rotation with sun gear member 652. Torque-transmitting mechanism 58F is selectively engagable to connect input member 616 for common rotation with carrier member 656 and carrier member 646.

The members of transmission 614 correspond with the lever diagram transmission 14 of FIG. 1 as follows: sun gear member 632 corresponds with node A; carrier member 636 corresponds with node B; ring gear member 634 corresponds with node C; sun gear member 652 corresponds with node D; sun gear member 642 corresponds with node E; carrier member 646 and carrier member 656 correspond with node F; ring gear member 644 and ring gear member 654 correspond with node G; and sun gear member 662 corresponds with node H. The torque-transmitting mechanisms 50F, 52F, 54F, 55F, 56F, 57F, and 58F correspond with torque-transmitting mechanisms 50, 52, 54, 55, 56, 57, and 58, respectively, and are engagable according to the same schedule of FIG. 2 to achieve the same number of forward speed ratios and two reverse speed ratios (e.g., thirteen different forward speed ratios, five different combinations of nine of which are operable in progression with single-transition shifts, etc.).

Figure 9:
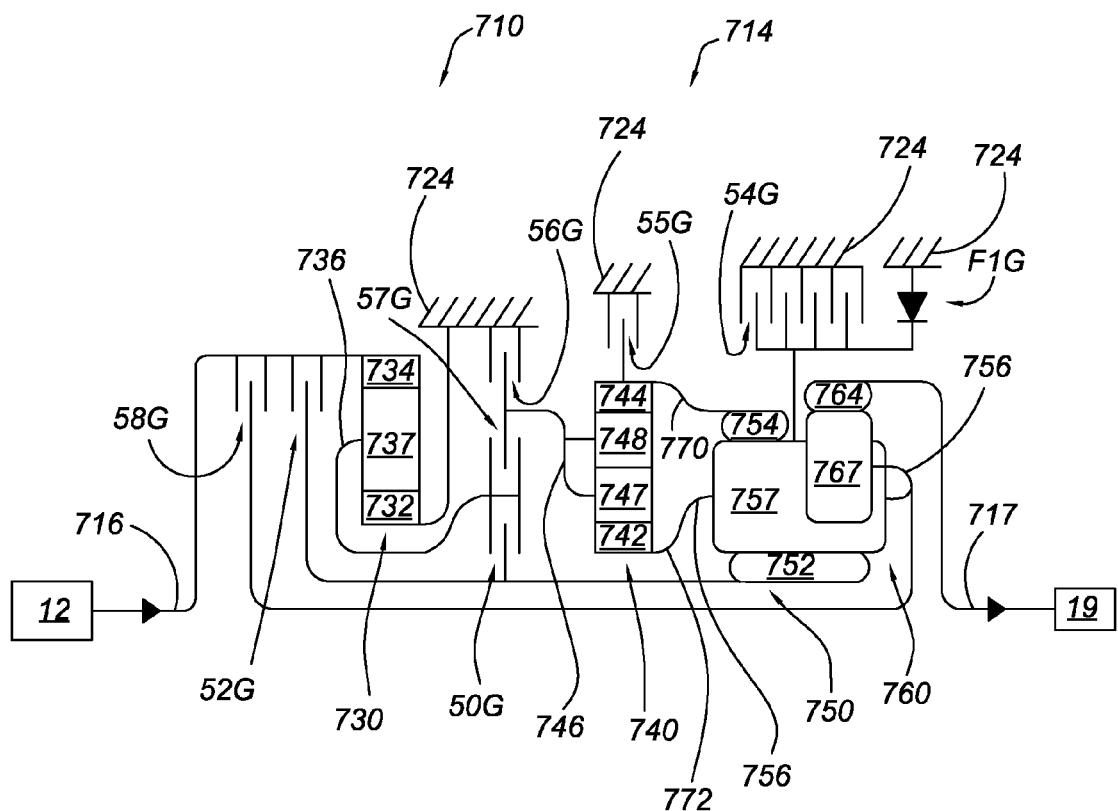
FIG. 9 is a seventh embodiment in stick diagram form of the transmission of FIG. 1.

Referring to FIG. 9, a powertrain 710 has a transmission 714 configured in accordance with and operable in like manner as the transmission 14 shown in lever diagram form in FIG. 1. The powertrain 710 includes engine 12 powering an input member 716 of the transmission 714. Final drive unit 19 is operatively connected to an output member 717 of the transmission 714.

The transmission 714 includes simple planetary gear set 730, as well as dual-pinion planetary gear set 740, as well as planetary gear sets 750 and 760 which are interconnected to form compound planetary gear set 750, 760. Planetary gear set 730 includes a sun gear member 732, a ring gear member 734, and a carrier member 736 that rotatably supports a plurality of pinion gears 737 that mesh with both the ring gear member 734 and the sun gear member 732.

Planetary gear set 740 includes a sun gear member 742, a ring gear member 744, and a carrier member 746 that rotatably supports first and second sets of pinion gears 747, 748, respectively. Pinion gears 747 mesh with sun gear member 742 and pinion gears 748. Pinion gears 748 mesh with pinion gears 747 and ring gear member 744.

Planetary gear set 750 includes sun gear member 752, ring gear member 754 and carrier member 756 that rotatably supports long pinion gears 757 that mesh with both the sun gear member 752 and the ring gear member 754. Planetary gear set 760 includes ring gear member 764, and a set of pinion gears 767, also rotatably supported by carrier member 756, that mesh with the long pinion gears 757 and with the ring gear member 764.

The input member 716 is continuously connected for common rotation with the ring gear member 734. Sun gear member 732 is continuously grounded to a stationary member 724, such as a casing of the transmission 714. Ring gear member 764 is continuously connected with output member 717. Interconnecting member 770 continuously connects ring gear member 744 with ring gear member 754. Interconnecting member 772 continuously connects sun gear member 742 with carrier member 756.

The transmission 714 has seven selectively engagable torque-transmitting mechanisms 50G, 52G, 54G, 55G, 56G, 57G, and 58G, as well as a free-wheeling one-way clutch F1G that is connected in parallel with torque-transmitting mechanism 54G and permits rotation in only one direction. Torque-transmitting mechanism 50G is selectively engagable to connect carrier member 736 for common rotation with sun gear member 752. Torque-transmitting mechanism 52G is selectively engagable to connect input member 716 for common rotation with sun gear member 752. Torque-transmitting mechanism 54G is selectively engagable to ground carrier member 756 and sun gear member 742 with stationary member 724. Free-wheeling one-way clutch F1G prevents rotation of carrier member 756 in a direction opposite the input member 716. Torque-transmitting mechanism 55G is selectively engagable to ground ring gear member 744 to the stationary member 724. Torque-transmitting mechanism 56G is selectively engagable to ground carrier member 746 to the stationary member 724. Torque-transmitting mechanism 57G is selectively engagable to connect carrier member 736 for common rotation with carrier member 746. Torque-transmitting mechanism 58G is selectively engagable to connect input member 716 for common rotation with carrier member 756 and sun gear member 742.

The members of transmission 714 correspond with the lever diagram transmission 14 of FIG. 1 as follows: sun gear member 732 corresponds with node A; carrier member 736 corresponds with node B; ring gear member 734 corresponds with node C; carrier member 746 corresponds with node D; ring gear member 744 and ring gear member 754 correspond with node E; sun gear member 742 and carrier member 756 correspond with node F; ring gear member 764 corresponds with node G; and sun gear member 752 corresponds with node H. The torque-transmitting mechanisms 50G, 52G, 54G, 55G, 56G, 57G, and 58G correspond with torque-transmitting mechanisms 50, 52, 54, 55, 56, 57, and 58, respectively, and are engagable according to the same schedule of FIG. 2 to achieve the same number of forward speed ratios and two reverse speed ratios (e.g., thirteen different forward speed ratios, five different combinations of nine of which are operable in progression with single-transition shifts, etc.).

Figure 10:
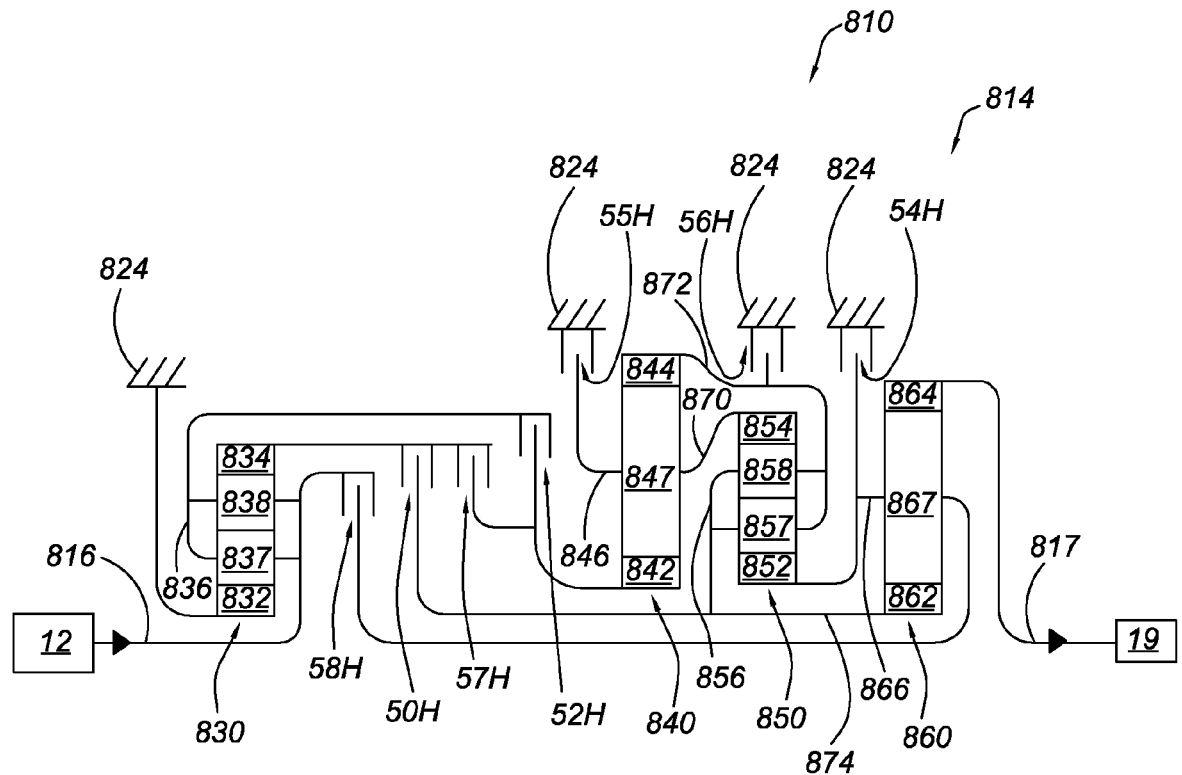
FIG. 10 is an eighth embodiment in stick diagram form of the transmission of FIG. 1.

Referring to FIG. 10, a powertrain 810 has a transmission 814 configured in accordance with and operable in like manner as the transmission 14 shown in lever diagram form in FIG. 1. The powertrain 810 includes engine 12 powering an input member 816 of the transmission 814. Final drive unit 19 is operatively connected to an output member 817 of the transmission 814.

The transmission 814 includes dual-pinion planetary gear set 830, simple planetary gear set 840, dual-pinion planetary gear set 850 and simple planetary gear set 860. Planetary gear set 830 includes a sun gear member 832, a ring gear member 834, and a carrier member 836 that rotatably supports first and second sets of pinion gears 837 and 838, respectively. Pinion gears 837 mesh with the sun gear member 832 and pinion gears 838. Pinion gears 838 mesh with the pinion gears 837 and the ring gear member 834.

Planetary gear set 840 includes a sun gear member 842, a ring gear member 844, and a carrier member 846 that rotatably supports pinion gears 847. Pinion gears 847 mesh with sun gear member 842 and ring gear member 844.

Planetary gear set 850 includes sun gear member 852, ring gear member 854 and carrier member 856 that rotatably supports first and second sets of pinion gears 857, 858, respectively. Pinion gears 857 mesh with the sun gear member 852 and with pinion gears 858. Pinion gears 858 mesh with pinion gears 857 and with the ring gear member 854.

Planetary gear set 860 includes sun gear member 862, ring gear member 864, and carrier member 866 that rotatably supports pinion gears 867 that mesh with both sun gear member 862 and ring gear member 864.

The input member 816 is continuously connected for common rotation with the carrier member 836. Sun gear member 832 is continuously grounded to a stationary member 824, such as a casing of the transmission 814. Ring gear member 864 is continuously connected with output member 817. Interconnecting member 870 continuously connects carrier member 846 with ring gear member 854. Interconnecting member 872 continuously connects ring gear member 844 with carrier member 856. Interconnecting member 874 continuously connects carrier member 856 for common rotation with sun gear member 862.

The transmission 814 has seven selectively engagable torque-transmitting mechanisms 50H, 52H, 54H, 55H, 56H, 57H, and 58H. Torque-transmitting mechanism 50H is selectively engagable to connect ring gear member 834 for common rotation with carrier member 856, ring gear member 844 and sun gear member 862. Torque-transmitting mechanism 52H is selectively engagable to connect carrier member 836 for common rotation with sun gear member 842. Torque-transmitting mechanism 54H is selectively engagable to ground carrier member 866 and sun gear member 852 with stationary member 824. Torque-transmitting mechanism 55H is selectively engagable to ground carrier member 846 to the stationary member 824. Torque-transmitting mechanism 56H is selectively engagable to ground carrier member 856 and ring gear member 844 to the stationary member 824. Torque-transmitting mechanism 57H is selectively engagable to connect ring gear member 834 for common rotation with sun gear member 842. Torque-transmitting mechanism 58H is selectively engagable to connect input member 816 and carrier member 836 for common rotation with carrier member 866 and sun gear member 852.

The members of transmission 814 correspond with the lever diagram transmission 14 of FIG. 1 as follows: sun gear member 832 corresponds with node A; ring gear member 834 corresponds with node B; carrier member 836 corresponds with node C; carrier member 856, sun gear member 862 and ring gear member 844 correspond with node D; carrier member 846 and ring gear member 854 correspond with node E; sun gear member 852 and carrier member 866 correspond with node F; ring gear member 864 corresponds with node G; and sun gear member 842 corresponds with node H. The torque-transmitting mechanisms 50H, 52H, 54H, 55H, 56H, 57H, and 58HG correspond with torque-transmitting mechanisms 50, 52, 54, 55, 56, 57, and 58, respectively, and are engagable according to the same schedule of FIG. 2 to achieve the same number of forward speed ratios and two reverse speed ratios (e.g., thirteen different forward speed ratios, five different combinations of nine of which are operable in progression with single-transition shifts, etc.).

Figure 11:
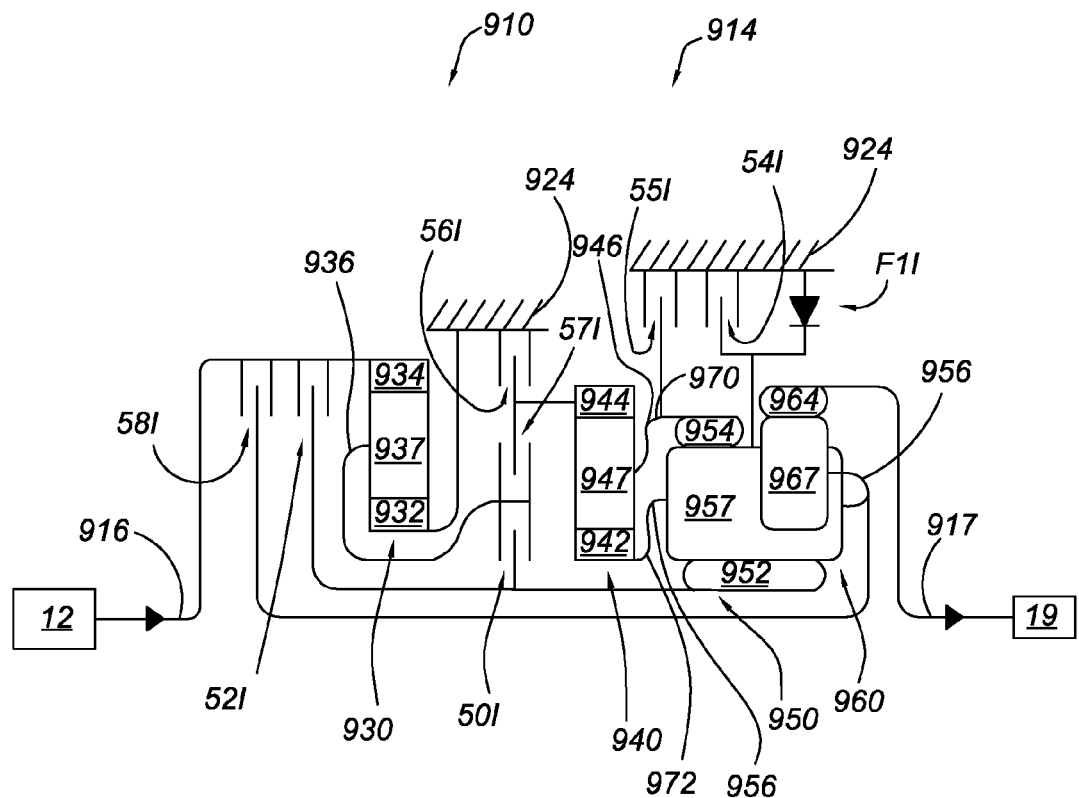
FIG. 11 is a ninth embodiment in stick diagram form of the transmission of FIG. 1.

Referring to FIG. 11, a powertrain 910 has a transmission 914 configured in accordance with and operable in like manner as the transmission 14 shown in lever diagram form in FIG. 1. The powertrain 910 includes engine 12 powering an input member 916 of the transmission 914. Final drive unit 19 is operatively connected to an output member 917 of the transmission 914.

The transmission 914 includes simple planetary gear sets 930 and 940, as well as planetary gear sets 950 and 960 which are interconnected to form compound planetary gear set 950, 960. Planetary gear set 930 includes a sun gear member 932, a ring gear member 934, and a carrier member 936 that rotatably supports a plurality of pinion gears 937 that mesh with both the ring gear member 934 and the sun gear member 932.

Planetary gear set 940 includes a sun gear member 942, a ring gear member 944, and a carrier member 946 that rotatably supports pinion gears 947. Pinion gears 947 mesh with sun gear member 942 and with the ring gear member 944.

Planetary gear set 950 includes sun gear member 952, ring gear member 954 and carrier member 956 that rotatably supports long pinion gears 957 that mesh with both the sun gear member 952 and the ring gear member 954. Planetary gear set 960 includes ring gear member 964, and a set of pinion gears 967, also rotatably supported by carrier member 956, that mesh with the long pinion gears 757 and with the ring gear member 964.

The input member 916 is continuously connected for common rotation with the ring gear member 934. Sun gear member 932 is continuously grounded to a stationary member 924, such as a casing of the transmission 914. Ring gear member 964 is continuously connected with output member 917. Interconnecting member 970 continuously connects carrier member 946 with ring gear member 954. Interconnecting member 972 continuously connects sun gear member 942 with carrier member 956.

The transmission 914 has seven selectively engagable torque-transmitting mechanisms 50I, 52I, 54I, 55I, 56I, 57I, and 58I, as well as a free-wheeling one-way clutch F1I that is connected in parallel with torque-transmitting mechanism 54I and permits rotation in only one direction. Torque-transmitting mechanism 50I is selectively engagable to connect carrier member 936 for common rotation with sun gear member 952. Torque-transmitting mechanism 52I is selectively engagable to connect input member 916 for common rotation with sun gear member 952. Torque-transmitting mechanism 54I is selectively engagable to ground carrier member 956 and sun gear member 942 with stationary member 924. Free-wheeling one-way clutch F1I prevents rotation of carrier member 956 in a direction opposite the input member 916. Torque-transmitting mechanism 55I is selectively engagable to ground ring gear member 954 and carrier member 946 to the stationary member 924. Torque-transmitting mechanism 56I is selectively engagable to ground ring gear member 944 to the stationary member 924. Torque-transmitting mechanism 57I is selectively engagable to connect carrier member 936 for common rotation with ring gear member 944. Torque-transmitting mechanism 58I is selectively engagable to connect input member 916 for common rotation with carrier member 956 and sun gear member 942.

The members of transmission 914 correspond with the lever diagram transmission 14 of FIG. 1 as follows: sun gear member 932 corresponds with node A; carrier member 936 corresponds with node B; ring gear member 934 corresponds with node C; ring gear member 944 correspond with node D; carrier member 946 and ring gear member 954 correspond with node E; sun gear member 942 and carrier member 956 correspond with node F; ring gear member 964 corresponds with node G; and sun gear member 952 corresponds with node H. The torque-transmitting mechanisms 50I, 52I, 54I, 55I, 56I, 57I, and 58I correspond with torque-transmitting mechanisms 50, 52, 54, 55, 56, 57, and 58, respectively, and are engagable according to the same schedule of FIG. 2 to achieve the same number of forward speed ratios and two reverse speed ratios (e.g., thirteen different forward speed ratios, five different combinations of nine of which are operable in progression with single-transition shifts, etc.).

Figure 12:
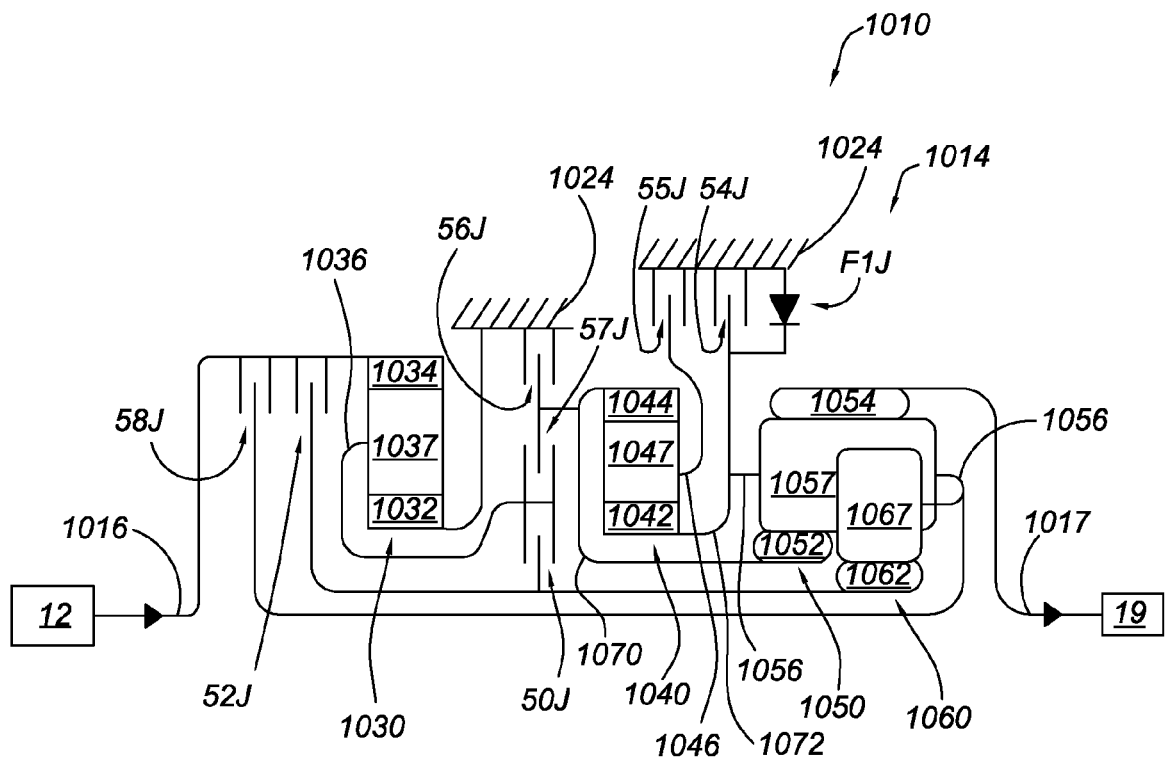
FIG. 12 is a tenth embodiment in stick diagram form of the transmission of FIG. 1.

Referring to FIG. 12, a powertrain 1010 has a transmission 1014 configured in accordance with and operable in like manner as the transmission 14 shown in lever diagram form in FIG. 1. The powertrain 1010 includes engine 12 powering an input member 1016 of the transmission 1014. Final drive unit 19 is operatively connected to an output member 1017 of the transmission 1014.

The transmission 1014 includes simple planetary gear sets 1030 and 1040, as well as planetary gear sets 1050 and 1060 which are interconnected to form compound planetary gear set 1050, 1060. Planetary gear set 1030 includes a sun gear member 1032, a ring gear member 1034, and a carrier member 1036 that rotatably supports a plurality of pinion gears 1037 that mesh with both the ring gear member 1034 and the sun gear member 1032.

Planetary gear set 1040 includes a sun gear member 1042, a ring gear member 1044, and a carrier member 1046 that rotatably supports pinion gears 1047 that intermeshes with the sun gear member 1042 and the ring gear member 1044. Pinion gears 1047 mesh with sun gear member 1042 and the ring gear member 1044.

Planetary gear set 1050 includes sun gear member 1052, ring gear member 1054 and carrier member 1056 that rotatably supports long pinion gears 1057 that mesh with both the sun gear member 1052 and the ring gear member 1054. Planetary gear set 1060 includes sun gear member 1062, and a set of pinion gears 1067, also rotatably supported by carrier member 1056, that mesh with the long pinion gears 1057 and with the sun gear member 1062.

The input member 1016 is continuously connected for common rotation with the ring gear member 1034. Sun gear member 1032 is continuously grounded to a stationary member 1024, such as a casing of the transmission 1014. Ring gear member 1054 is continuously connected with output member 1017. Interconnecting member 1070 continuously connects ring gear member 1044 with sun gear member 1052. Interconnecting member 1072 continuously connects sun gear member 1042 with carrier member 1056.

The transmission 1014 has seven selectively engagable torque-transmitting mechanisms 50J, 52J, 54J, 55J, 56J, 57J, and 58J, as well as a free-wheeling one-way clutch F1J that is connected in parallel with torque-transmitting mechanism 54J and permits rotation in only one direction. Torque-transmitting mechanism 50J is selectively engagable to connect carrier member 1036 for common rotation with sun gear member 1062. Torque-transmitting mechanism 52J is selectively engagable to connect input member 1016 for common rotation with sun gear member 1062. Torque-transmitting mechanism 54J is selectively engagable to ground carrier member 1056 and sun gear member 1042 with stationary member 1024. Free-wheeling one-way clutch F1J prevents rotation of carrier member 1056 in a direction opposite the input member 1016. Torque-transmitting mechanism 55J is selectively engagable to ground carrier member 1046 to the stationary member 1024. Torque-transmitting mechanism 56J is selectively engagable to ground ring gear member 1044 and sun gear member 1052 to the stationary member 1024. Torque-transmitting mechanism 57J is selectively engagable to connect carrier member 1036 for common rotation with ring gear member 1044 and sun gear member 1052. Torque-transmitting mechanism 58J is selectively engagable to connect input member 1016 for common rotation with carrier member 1056 and sun gear member 1042.

The members of transmission 1014 correspond with the lever diagram transmission 14 of FIG. 1 as follows: sun gear member 1032 corresponds with node A; carrier member 1036 corresponds with node B; ring gear member 1034 corresponds with node C; ring gear member 1044 and sun gear member 1052 correspond with node D; carrier member 1046 corresponds with node E; sun gear member 1042 and carrier member 1056 correspond with node F; ring gear member 1054 corresponds with node G; and sun gear member 1062 corresponds with node H. The torque-transmitting mechanisms 50J, 52J, 54J, 55J, 56J, 57J, and 58J correspond with torque-transmitting mechanisms 50, 52, 54, 55, 56, 57, and 58, respectively, and are engagable according to the same schedule of FIG. 2 to achieve the same number of forward speed ratios and two reverse speed ratios (e.g., thirteen different forward speed ratios, five different combinations of nine of which are operable in progression with single-transition shifts, etc.).

Figure 13:
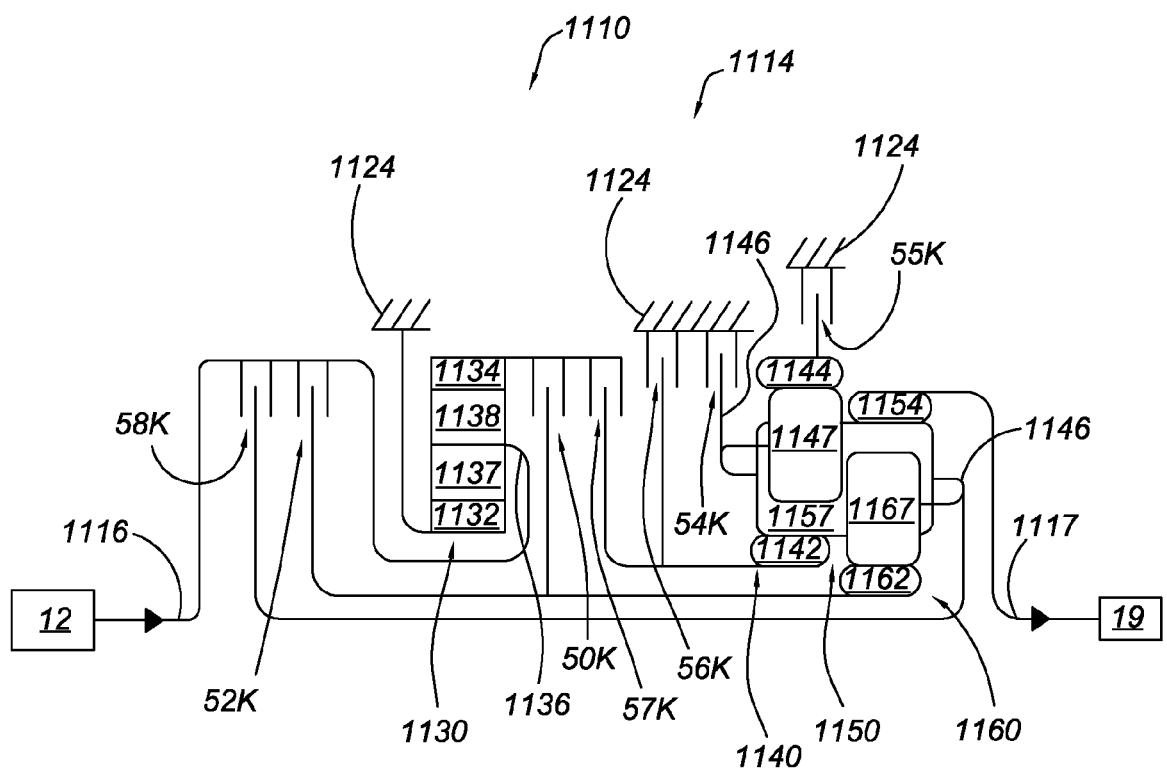
FIG. 13 is an eleventh embodiment in stick diagram form of the transmission of FIG. 1.

Referring to FIG. 13, a powertrain 1110 has a transmission 1114 configured in accordance with and operable in like manner as the transmission 14 shown in lever diagram form in FIG. 1. The powertrain 1110 includes engine 12 powering an input member 1116 of the transmission 1114. Final drive unit 19 is operatively connected to an output member 1117 of the transmission 1114.

The transmission 1114 includes dual-pinion planetary gear set 1130 and planetary gear sets 1140, 1150 and 1160 which are interconnected to form compound planetary gear set 1140, 1150, 1160. Planetary gear set 1130 includes a sun gear member 1132, a ring gear member 1134, and a carrier member 1136 that rotatably supports first and second sets of pinion gears 1137, 1138, respectively. Pinion gears 1137 mesh with both the sun gear member 1132 and the pinion gears 1138. Pinion gears 1138 mesh with pinion gears 1137 and ring gear member 1134.

Planetary gear set 1140 includes a sun gear member 1142, a ring gear member 1144, and a carrier member 1146 that rotatably supports pinion gears 1147. Pinion gears 1147 mesh with ring gear member 1144.

Planetary gear set 1150 includes ring gear member 1154, and long pinion gears 1157 that mesh with both the sun gear member 1142, the ring gear member 1154, and pinion gears 1147. Pinion gears 1157 are also rotatably supported on carrier member 1146. Planetary gear set 1160 includes sun gear member 1162, and a set of pinion gears 1167 that mesh with the long pinion gears 1157 and with the sun gear member 1162. Pinion gears 1167 are also rotatably supported on the carrier member 1146.

The input member 1116 is continuously connected for common rotation with the carrier member 1136. Sun gear member 1132 is continuously grounded to a stationary member 1124, such as a casing of the transmission 1114. Ring gear member 1154 is continuously connected with output member 1117.

The transmission 1114 has seven selectively engagable torque-transmitting mechanisms 50K, 52K, 54K, 55K, 56K, 57K, and 58K. Torque-transmitting mechanism 50K is selectively engagable to connect ring gear member 1134 for common rotation with sun gear member 1162. Torque-transmitting mechanism 52K is selectively engagable to connect input member 1116 for common rotation with sun gear member 1162. Torque-transmitting mechanism 54K is selectively engagable to ground carrier member 1146 with stationary member 1124. Torque-transmitting mechanism 55K is selectively engagable to ground ring gear member 1144 to the stationary member 1124. Torque-transmitting mechanism 56K is selectively engagable to ground sun gear member 1142 to the stationary member 1124. Torque-transmitting mechanism 57K is selectively engagable to connect ring gear member 1134 for common rotation with sun gear member 1142. Torque-transmitting mechanism 58K is selectively engagable to connect input member 1116 for common rotation with carrier member 1146.

The members of transmission 1114 correspond with the lever diagram transmission 14 of FIG. 1 as follows: sun gear member 1132 corresponds with node A; carrier member 1136 corresponds with node B; ring gear member 1134 corresponds with node C; sun gear member 1142 correspond with node D; ring gear member 1144 corresponds with node E; carrier member 1146 corresponds with node F; ring gear member 1154 corresponds with node G; and sun gear member 1162 corresponds with node H. The torque-transmitting mechanisms 50K, 52K, 54K, 55K, 56K, 57K, and 58K correspond with torque-transmitting mechanisms 50, 52, 54, 55, 56, 57, and 58, respectively, and are engagable according to the same schedule of FIG. 2 to achieve the same number of forward speed ratios and two reverse speed ratios (e.g., thirteen different forward speed ratios, five different combinations of nine which are operable in progression with single-transition shifts, etc.).

Figure 14:
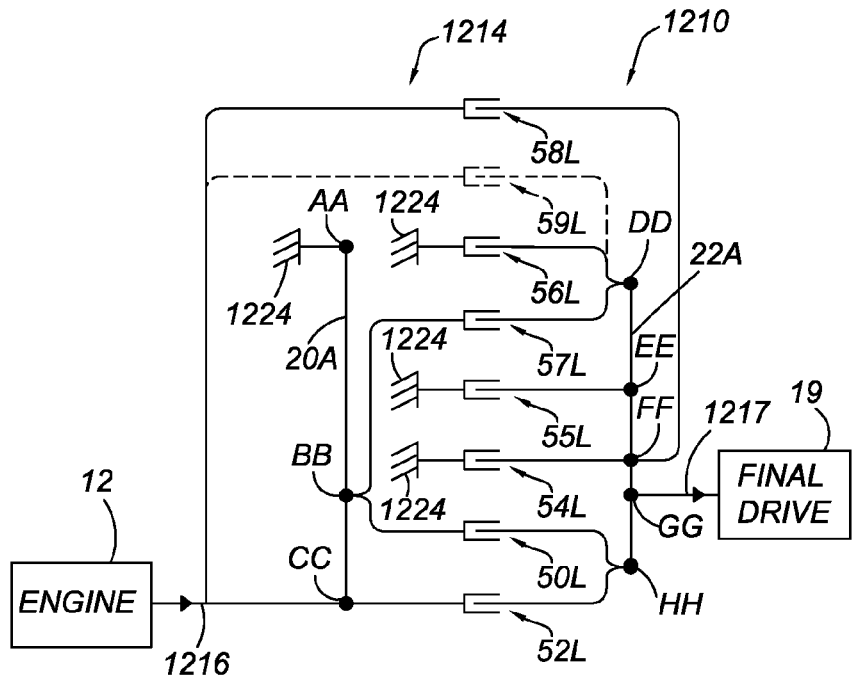
FIG. 14 is an alternate embodiment of a transmission shown in lever diagram form.

FIG. 14 illustrates a powertrain 1210 mounted on and partially forming a vehicle (not shown). The powertrain 1210 includes engine 12 connected to a transmission 1214. The transmission 1214 is designed to receive driving power from the engine 12, as discussed below. The engine 12 powers an input member 1216 of the transmission 14. A final drive unit 19 is operatively connected to an output member 1217 of the transmission 1214.

The transmission 1214 is represented in lever diagram form in FIG. 14 and is the same as, and can be represented by the lever diagram transmission 14 of FIG. 1 as well. The transmission 1214 includes a three-node lever 20A representing a first planetary gear set having a first, a second and a third member, represented by nodes AA, BB and CC, respectively. The members may be a ring gear member, a sun gear member and a carrier member, although not necessarily in that order. Nodes, AA, BB and CC are referred to in the claims as the first, second and third nodes, respectively.

The transmission 14 further includes a five-node lever 22A representing second, third and fourth planetary gear sets interconnected as a compound gear set having members represented by nodes DD, EE, FF, GG and HH, respectively. As those skilled in the art will readily understand, two planetary gear sets may be represented as a single lever in a lever diagram when two different members of one of the planetary gear sets are connected for common rotation with two different members of the other planetary gear set. Each of the nodes DD, EE, FF, GG and HH represent a ring gear member, a sun gear member, or a carrier member, although not necessarily in that order. Nodes DD, EE, FF, GG and HH are referred to in the claims as the fourth, fifth, sixth, seventh, and eighth node, respectively.

The input member 1216 is connected for common rotation with node CC. The output member 1217 is connected for common rotation with node GG. Node AA is continuously grounded to a stationary member 1224.

The transmission 1214 also has selectively engagable torque-transmitting mechanisms that provide various speed ratios, as described below. Torque-transmitting mechanism 50L, a rotating-type clutch, is selectively engagable to connect node BB for common rotation with node HH. Torque-transmitting mechanism 52L, also a rotating-type clutch, is selectively engagable to connect node CC for common rotation with node HH. Another torque-transmitting mechanism 54L, a stationary clutch, also referred to as a brake, is selectively engagable to ground node FF to the stationary member 1224. Torque-transmitting mechanism 55L, another stationary clutch or brake, is selectively engagable to ground node EE to the stationary member 1224. Torque-transmitting mechanism 56L, also a brake, is selectively engagable to ground node DD to the stationary member 1224. Torque-transmitting mechanism 57L, a rotating-type clutch, is selectively engagable to connect node BB for common rotation with node DD. Torque-transmitting mechanism 58L, a rotating-type clutch, is selectively engagable to connect the input member 1216 (and also node CC) for common rotation with node FF. Torque-transmitting mechanism 59L, an optional rotating-type clutch, is selectively engagable to connect the input member 1216 (and also node CC) for common rotation with node DD.

Thus, the transmission 1214 is the same as transmission 14, with nodes AA, BB, CC, DD, EE, FF, GG and HH corresponding with nodes A, B, C, D, E, F, G, and H, respectively. Torque-transmitting mechanisms 50, 52, 54, 55, 56, 57, 58 and 59 correspond with torque-transmitting mechanisms 50L, 52L, 54L, 55L, 56L, 57L, 58L and 59L, respectively, and are engagable in the same combinations to provide the thirteen forward speed ratios and two reverse speed ratios indicated in FIG. 2.

Figures 15, 16:
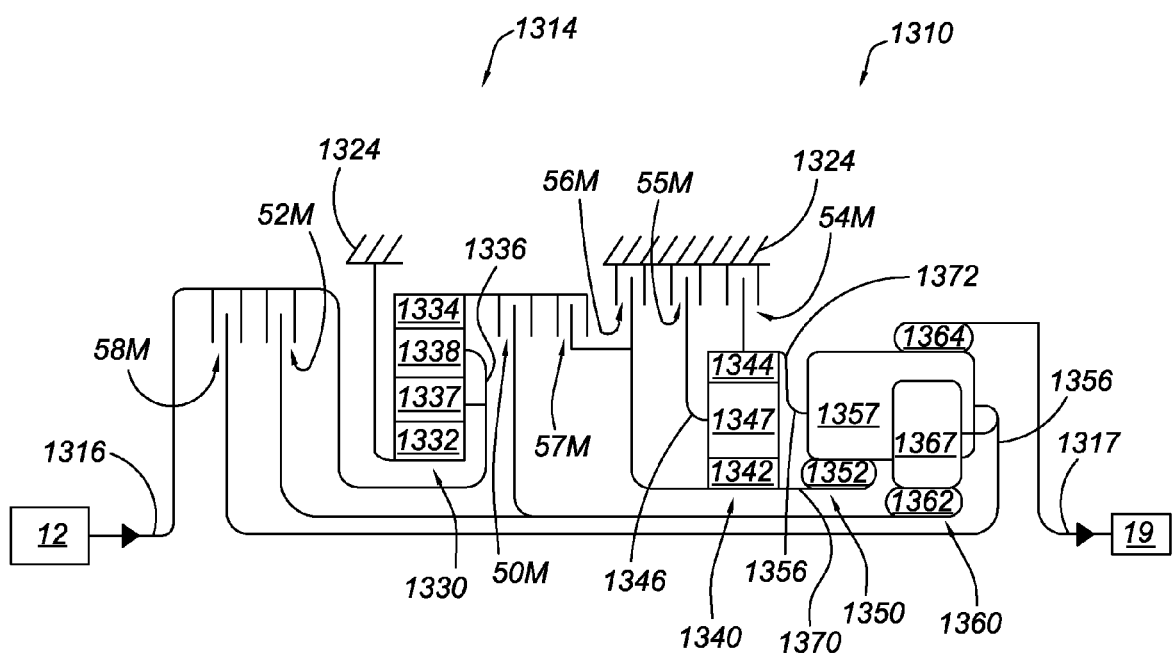
FIG. 15 is a truth table showing an engagement schedule for the torque-transmitting mechanisms of the transmission of FIG. 14 to establish eight forward speed ratios and a reverse speed ratio.
FIG. 16 is a first embodiment in stick diagram form of the transmission of FIG. 14.

FIG. 15 illustrates one particular combination of eight forward speed ratios and one reverse speed ratio that may be attained with the transmission 1214 of FIG. 14. As can be determined from FIG. 15, the eight forward speeds are operable in progression from 1st to 8th with single-transition shifts. There are also many single-transition skip shifts available. For example, the sixth forward speed ratio (6th) can shift to or be shifted to from every other forward speed ratio listed in FIG. 15 except the first forward speed ratio (1st). Thus, underdrive speed ratios 2nd-5th can be accessed by a single-transition shift in the event of sudden throttle input (i.e., sudden increase in rotation of speed of the input member).

The torque-transmitting mechanisms 50L, 52L, 54L, 55L, 56L, 57L and 58L are selectively engagable in the different combinations of pairs, as illustrated in FIG. 15, to a reverse speed ratio R, and eight forward speed ratios (1st, 2nd, 3rd, 4th, 5th, 6th, 7th, and 8th) between the input member 16 and the output member 17. Four additional underdrive ratios can also be attained by engaging torque-transmitting mechanism 50L instead of 52L in speed ratios 3rd, 4th, 5th and 6th. These additional ratios allow flexibility on reacting to sudden throttle inputs. An over-drive ninth forward speed ratio is available by engaging torque-transmitting-mechanisms 55L and 58L. Thus, a total of thirteen different forward speed ratios are available.

As described further below, torque-transmitting mechanism 154, used to partially establish certain of the speed ratios of FIG. 15, may also be used in an integrated friction launch in lieu of a torque converter A controller (not shown) is operatively connected with the torque-transmitting mechanisms and is programmed with an algorithm to select different ones of the speed ratios set forth in FIG. 15 to provide different combinations of the speed ratios. Less than eight of the forward speed ratios may also be selected, such as to enable a six-speed, seven-speed or eight-speed transmission with single-transition shifts. The speed ratios chosen or permitted by the controller may depend upon whether single-transition shifts are desired. As is apparent from FIG. 15, the eight forward speed ratios 1st, 2nd, 3rd, 4th, 5th, 6th, 7th, and 8th are operable in progression with single-transition shifts. Additionally, there are multiple single-transition upshifts (shifts from a lower numbered speed ratio to a higher numbered speed ratio (i.e., 1st to 2nd), which are shifts from a higher numerical speed ratio to a lower numerical speed ratio.

Because each of the speed ratios established as set forth in FIG. 15 require only two torque-transmitting mechanisms to be applied, and because most utilize only one rotating clutch (i.e., only one of torque-transmitting mechanisms 50L, 52L, 57L and 58L), hydraulic leakage losses are minimized, as these are more commonly encountered with rotating-type than with stationary-type torque-transmitting mechanisms. Additionally, the transmission 1214 is able to be used in both front-wheel drive and rear-wheel drive applications, as the input member 1216 and the output member 1217 may be made collinear, as corresponding input and output members in the stick-diagram embodiments of FIG. 16 are arranged.

Another feature of the transmission 1214 of FIG. 14 is that torque-transmitting mechanism 54L is a grounding clutch (i.e., a brake) that is engaged in the lowest forward speed ratios 1st and 2nd, as well as in the lowest reverse speed ratio R1 in order for the transmission 1214 to launch a vehicle (i.e., to cause rotation of the output member 1217 from a stationary state). For example, the reaction torque provided by the stationary member 1224 when the torque-transmitting mechanisms 50L and 54L are engaged allows the output member 1217 to rotate in a forward direction, establishing the forward speed ratio 1st. Using a friction-based torque-transmitting mechanism that is necessary to establish a given speed ratio in order to launch the vehicle as well, provides packaging and weight savings relative to a transmission having the same gear sets and torque-transmitting mechanisms but also requiring a torque converter.

If the optional torque-transmitting mechanism 59L is provided, then two additional reverse speed ratios, not listed in Table 15, may be achieved by engaging torque-transmitting mechanism 59L along with either torque-transmitting mechanism 54L or 55L, to provide two additional reverse speed ratios one of which (the latter) is operable in progression at a higher numerical value than R2 and the other of which (the former) is operable at a numerical value between that of speed ratios R2 and R1. The optional torque-transmitting mechanism 59L may also be engaged with torque-transmitting mechanism 50L to establish an additional underdrive speed ratio.

Referring to FIG. 16, one particular embodiment of a powertrain 1310 having a transmission 1314 is shown in stick diagram form that is representable by the lever diagram of FIG. 14 and the identical lever diagram of FIG. 2, and is configured in accordance with and operable in like manner as the transmission 1214 shown in lever diagram form in FIG. 14. The powertrain 1310 includes engine 12 powering an input member 1316 of the transmission 1314. Final drive unit 19 is operatively connected to an output member 1317 of the transmission 1314.

The transmission 1314 includes dual-pinion planetary gear set 1330, simple planetary gear set 1340, as well as compound, interconnected planetary gear sets 1350, 1360. Planetary gear set 1330 includes a sun gear member 1332, a ring gear member 1334, and a carrier member 1336 that rotatably supports first and second sets of pinion gears 1337, 1338, respectively. Pinion gears 1337 mesh with both the sun gear member 1332 and with pinion gears 1338. Pinion gears 1338 also mesh with ring gear member 1334.

Planetary gear set 1340 includes a sun gear member 1342, a ring gear member 1344, and a carrier member 1346 that rotatably supports a plurality of pinion gears 1347 that mesh with both the ring gear member 1344 and the sun gear member 1342.

Compound planetary gear sets 1350, 1360 include gear set 1350 having a sun gear member 1352, and a carrier member 1356 that rotatably supports a plurality of long pinion gears 1357 that mesh with the sun gear member. The carrier member 1356 also rotatably supports a second set of pinion gears 1367 that are included in gear set 1360. Gear set 1360 also includes ring gear member 1364. Pinion gears 1357 also mesh with ring gear member 1364. Pinion gears 1367 mesh with the pinion gears 1357 and with sun gear member 1362.

The input member 1316 is continuously connected for common rotation with the ring gear member 1356. Sun gear member 1332 is continuously grounded to a stationary member 1324, such as a casing of the transmission 1314. Ring gear member 1364 is continuously connected for common rotation with output member 1317. An interconnecting member 1370 continuously connects sun gear member 1342 for common rotation with sun gear member 1352. Interconnecting member 1372 continuously connects ring gear member 1344 for common rotation with carrier member 1356.

The transmission 1314 has seven selectively engagable torque-transmitting mechanisms 50M, 52M, 54M, 55M, 56M, 57M, and 58M. Torque-transmitting mechanism 50M is selectively engagable to connect sun gear member 1362 for common rotation with ring gear member 1334. Torque-transmitting mechanism 52M is selectively engagable to connect input member 1316 for common rotation with sun gear member 1362. Torque-transmitting mechanism 54M is selectively engagable to ground ring gear member 1344 with stationary member 1324. Torque-transmitting mechanism 55M is selectively engagable to ground carrier member 1346 to the stationary member 1324. Torque-transmitting mechanism 56M is selectively engagable to ground sun gear member 1342 to the stationary member 1324. Torque-transmitting mechanism 57M is selectively engagable to connect ring gear member 1334 for common rotation with sun gear member 1342 and sun gear member 1352. Torque-transmitting mechanism 58M is selectively engagable to connect input member 1316 for common rotation with carrier member 1356 and ring gear member 1344.

The members of transmission 1314 correspond with the lever diagram transmission 14 of FIG. 1 as follows: sun gear member 1332 corresponds with node A; carrier member 1336 corresponds with node B; ring gear member 1334 corresponds with node C; sun gear members 1342 and 1352 correspond with node D; carrier member 1346 corresponds with node E; ring gear member 1344 and carrier member 1356 correspond with node F; ring gear member 1364 corresponds with node G; and sun gear member 1362 corresponds with node H. The torque-transmitting mechanisms 50M, 52M, 54M, 55M, 56M, 57M, and 58M correspond with torque-transmitting mechanisms 50, 52, 54, 55, 56, 57, and 58, respectively, and are engagable according to the same schedule of FIG. 2 to achieve the same number of forward speed ratios and two reverse speed ratios (e.g., thirteen different forward speed ratios, five different combinations of nine of which are operable in progression with single-transition shifts, etc.).

Similarly, the members of transmission 1314 correspond with the lever diagram transmission 1214 of FIG. 14 as follows: sun gear member 1332 corresponds with node AA; carrier member 1336 corresponds with node BB; ring gear member 1334 corresponds with node CC; sun gear members 1342 and 1352 correspond with node DD; carrier member 1346 corresponds with node EE; ring gear member 1344 and carrier member 1356 correspond with node FF; ring gear member 1364 corresponds with node GG; and sun gear member 1362 corresponds with node HH. The torque-transmitting mechanisms 50M, 52M, 54M, 55M, 56M, 57M, and 58M correspond with torque-transmitting mechanisms 50L, 52L, 54L, 55L, 56L, 57L, and 58L, respectively, and are engagable according to the same schedule of FIG. 15 to achieve the same number of forward speed ratios and two reverse speed ratios (e.g., eight forward speed ratios which are operable in progression with single-transition shifts, etc., and one reverse speed ratio).

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
an input member and an output member;
multiple planetary gear sets including a first planetary gear set having a first, a second and a third member, and interconnected second, third, and forth planetary gear sets having member, and interconnected second, third, and fourth planetary gear sets having a fourth, a fifth, a sixth, a seventh, and an eighth member;
seven torque-transmitting mechanisms including three rotating clutches selectively connecting selected ones of the members of the first planetary gear set to selected ones of the members of the interconnected second, third, and fourth planetary gear sets, one rotating clutch selectively connecting the input member with one of the members of the interconnected second, third, and fourth planetary gear sets, said seven torque-transmitting mechanisms also including three brakes grounding selected ones of the members of the interconnected second, third, and fourth planetary gear sets to a stationary member; wherein one of the members of the first planetary gear set is continuously grounded to the stationary member;
wherein the input member is connected with one of the members of the first planetary gear set; wherein the output member is connected with one of the members of the interconnected second, third, and fourth planetary gear sets; and
wherein the torque-transmitting mechanisms are engagable in different combinations to provide at least eight forward speed ratios and a reverse speed ratio between the input member and the output member.

2. The multi-speed transmission of claim 1, wherein the torque-transmitting mechanisms are engagable in additional different combinations to provide five alternate forward speed ratios between the input member and the output member; and wherein there are five different combinations of nine forward speed ratios selected from said at least eight forward speed ratios and five alternate speed ratios operable in progression with single-transition shifts between each forward speed ratio.

3. The multi-speed transmission of claim 2, wherein shifts between said at least eight forward speed ratios and five alternate forward speed ratios include eighty different single-transition shifts.

4. The multi-speed transmission of claim 2, wherein said at least eight forward speed ratios and five alternate forward speed ratios include a direct drive speed ratio; and wherein shifts between the direct drive speed ratio and eight others of said at least eight forward speed ratios and five alternate forward speed ratios are single-transition shifts.

5. The multi-speed transmission of claim 2, wherein each of said at least eight forward speed ratios and five alternate speed ratios may be obtained by a single-transition shift from at least five other of the forward speed ratios.

6. The multi-speed transmission of claim 1, wherein said at least eight forward speed ratios are operable in progression using single-transition shifts.

7. The multi-speed transmission of claim 1, wherein at least two of the interconnected second, third and fourth planetary gear sets form a compound planetary gear set.

8. The multi-speed transmission of claim 1, wherein shifts between said at least eight forward speed ratios include multiple single-transition upshifts.

9. The multi-speed transmission of claim 1, wherein the seven torque-transmitting mechanisms are engaged in different combinations of pairs in each of said at least eight forward and one reverse speed ratios.

10. The multi-speed transmission of claim 1, wherein the seven torque-transmitting mechanisms include a grounding clutch engaged in at least one of said at least eight forward speed ratios and in the reverse speed ratio for vehicle launch; and wherein the transmission is characterized by the absence of a torque converter.

11. The multi-speed transmission of claim 1, wherein engagement of selected ones of said seven torque-transmitting mechanisms establishes two reverse speed ratios, and further comprising:
an additional torque-transmitting mechanism selectively engageable to connect the input member and the third member for common rotation with the fourth member; wherein selective engagement of selected ones of said seven torque-transmitting mechanisms and said additional torque-transmitting mechanisms provides two additional reverse speed ratios, for a total of four reverse speed ratios; and wherein said four reverse speed ratios are operable in progression.

12. The multi-speed transmission of claim 1,
wherein the input member is continuously connected for common rotation with the third member; wherein the output member is continuously connected for common rotation with the seventh member; wherein the first member is continuously grounded to the stationary member;
wherein a first of the rotating clutches is selectively engagable to connect the second member for common rotation with the eighth member; wherein a second of the rotating clutches is selectively engagable to connect the third member for common rotation with the eighth member; wherein a third of the rotating clutches is selectively engagable to connect the second member for common rotation with the fourth member; wherein a fourth of the rotating clutches is selectively engagable to connect the input member for common rotation with the sixth member;
wherein a first of the three brakes is selectively engagable to ground the sixth member to the stationary member; wherein a second of the three brakes is selectively engagable to ground the fifth member to the stationary member; and wherein a third of the three brakes is selectively engagable to ground the fourth member to the stationary member.

13. The multi-speed transmission of claim 1, further comprising:
a freewheeling, one-way torque-transmitting mechanism connected in parallel with one of the brakes.

14. A multi-speed transmission comprising:
multiple planetary gear sets having a first planetary gear set with a first, a second and a third member, and interconnected second, third and fourth planetary gear sets with a fourth, a fifth, a sixth, a seventh, and an eighth member;
an input member and an output member;
wherein the input member is continuously connected for rotation with the third member; wherein the output member is continuously connected for rotation with the seventh member; wherein the first member is continuously grounded to the stationary member;
a first rotating clutch selectively engagable to connect the second member for common rotation with the eighth member;
a second rotating clutch selectively engagable to connect the third member for common rotation with the eighth member;
a third rotating clutch selectively engagable to connect the second member for common rotation with the fourth member;
a fourth rotating clutch selectively engagable to connect the input member for common rotation with the sixth member;
a first brake selectively engagable to ground the sixth member to the stationary member;
a second brake selectively engagable to ground the fifth member to the stationary member;
a third brake selectively engagable to ground the fourth member to a stationary member; and
wherein the torque-transmitting mechanisms are engagable in different combinations to provide at least eight forward speed ratios, five alternate forward speed ratios, and two reverse speed ratios; and wherein different combinations of nine of said at least eight forward speed ratios and five alternate forward speed ratios are operable in progression with single-transition shifts between each speed ratio.

15. The multi-speed transmission of claim 14, wherein five different combinations of nine forward speed ratios selected from said at least eight forward speed ratios and five alternate forward speed ratios are operable in progression with single-transition shifts between each speed ratio.

16. A multi-speed transmission comprising:
an input member;
an output member;
a first planetary gear set having a first sun gear member, a first ring gear member, a first carrier member, a first set of pinion gears and a second set of pinion gears rotatably supported by the first carrier member; wherein the first sun gear member meshes with the first set of pinion gears; wherein the second set of pinion gears meshes with the first set of pinion gears and with the first ring gear member;
a second planetary gear set having a second sun gear member, a second ring gear member, and a second carrier member rotatably supporting a third set of pinion gears that intermesh with both the second sun gear member and the second ring gear member;
interconnected planetary gear sets forming a compound planetary gear set including third and fourth sun gear members, a common carrier member rotatably supporting fourth and fifth sets of pinion gears, and a third ring gear member; wherein the third sun gear member meshes with the fourth set of pinion gears and the fourth sun gear member meshes with the fifth set of pinion gears; wherein the fourth and fifth sets of pinion gears mesh with one another; wherein only the fifth set of pinion gears meshes with the ring gear member;
wherein the input member is continuously connected for common rotation with the first carrier member; wherein the output member is continuously connected for common rotation with the third ring gear member; wherein the first sun gear member is continuously grounded to a stationary member;
a first interconnecting member continuously connecting the second ring gear member with the common carrier member;
a second interconnecting member continuously connecting the second sun gear member with the third sun gear member;

a first rotating-type clutch selectively engagable to connect the first ring gear member for common rotation with the fourth sun gear member;

a second rotating-type clutch selectively engagable to connect the input member for common rotation with the fourth sun gear member;

a third rotating-type clutch selectively engagable to connect the first ring gear member for common rotation with the third sun gear member;

a fourth rotating-type clutch selectively engagable to connect the input member for common rotation with the common carrier member;

a first brake selectively engagable to ground the second ring gear member to the stationary member;

a second brake selectively engagable to ground the second carrier member to the stationary member;

a third brake selectively engagable to ground the second sun gear member to the stationary member; and wherein the clutches and brakes are selectively engagable in different combinations of two to provide at least eight forward speed ratios and at least one reverse speed ratio; and wherein said at least eight forward speed ratios are operable in progression with single-transition shifts.

* * * * *